US008290978B2

(12) United States Patent
Nishio et al.

(10) Patent No.: US 8,290,978 B2
(45) Date of Patent: Oct. 16, 2012

(54) INFORMATION PROCESSING APPARATUS, INFORMATION PROCESSING METHOD, PROGRAM, AND STORAGE MEDIUM

(75) Inventors: Masahiro Nishio, Higashiyamato (JP); Nobuyuki Shigeeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/632,392

(22) Filed: Dec. 7, 2009

(65) Prior Publication Data

US 2010/0077455 A1    Mar. 25, 2010

Related U.S. Application Data

(63) Continuation of application No. 11/220,248, filed on Sep. 6, 2005, now Pat. No. 7,647,319.

(51) Int. Cl.
*G06F 17/30* (2006.01)

(52) U.S. Cl. ........ 707/781; 707/706; 707/713; 707/722; 707/736; 707/785; 709/217; 709/224; 713/155; 713/153; 714/4; 714/819

(58) Field of Classification Search .......... 707/706, 707/713, 722, 736, 758, 782, 783, 785, 999.009, 707/999.01; 709/217, 224; 713/155, 153; 714/4, 819
See application file for complete search history.

(56) References Cited

U.S. PATENT DOCUMENTS

| | | | | |
|---|---|---|---|---|
| 6,157,953 A | * | 12/2000 | Chang et al. | 709/225 |
| 2003/0135628 A1 | * | 7/2003 | Fletcher et al. | 709/229 |
| 2003/0154406 A1 | * | 8/2003 | Honarvar et al. | 713/201 |
| 2004/0225952 A1 | * | 11/2004 | Brown et al. | 714/819 |
| 2005/0015643 A1 | * | 1/2005 | Davis et al. | 714/4 |

OTHER PUBLICATIONS

"Advanced Measures Gradually Enhance Security, Consider Outsourcing If Lacking Manpower" Nikkei Internet Technology, Free Unix at Risk, Chapter 4, pp. 76-81, No. 16, Nikkei Business Publications, Inc. Oct. 22, 1998.
Sep. 21, 2010 Japanese Office Action, issued in Japanese Patent Application No. 2004-258406.
Sep. 21, 2010 Japanese Office Action, issued in Japanese Patent Application No. 2004-355882.

* cited by examiner

*Primary Examiner* — Syling Yen
(74) *Attorney, Agent, or Firm* — Cowan, Liebowitz & Latman, P.C.

(57) ABSTRACT

This invention has as its object to attain strong security and to implement network solutions with high convenience and simplicity with low cost upon providing Web services. To this end, an information processing apparatus according to this invention has the following arrangement. That is, an information processing apparatus (1400) which includes a plurality of Web services (110 and the like) and a plurality of authentication/authorization services (107 and the like), is characterized by having an XML script unit (104) which holds an XML script (106) that describes association between information pertaining to respective Web services and information pertaining to the authentication/authorization services that execute authentication processing upon providing the respective Web services, and an arbitration service (103) which determines information pertaining to the authentication/authorization service described in association with the Web service requested by the user, and in that when the user is authenticated using the determined authentication/authorization service, the Web service requested by the user is provided.

10 Claims, 21 Drawing Sheets

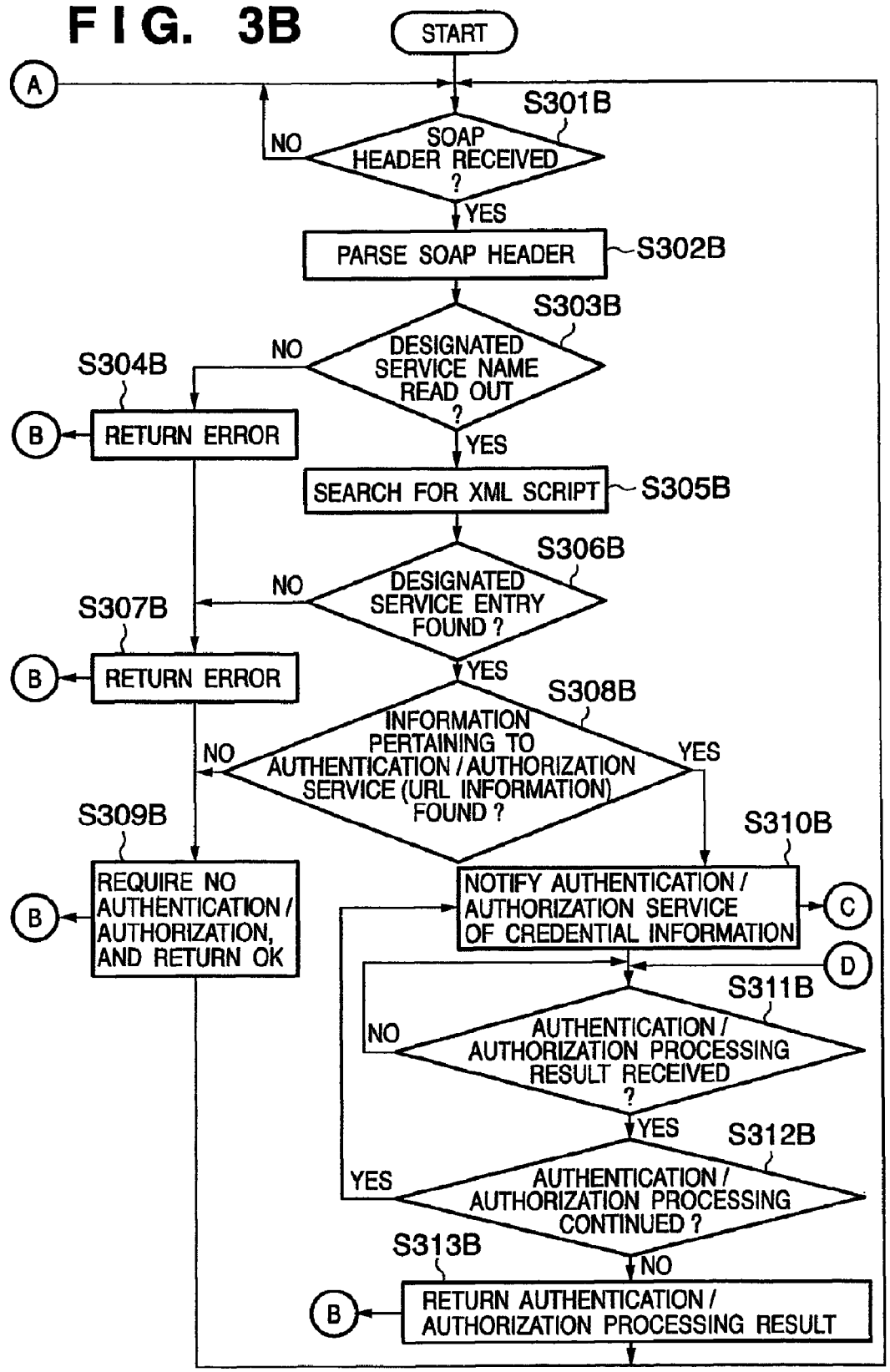

FIG. 4

```
<Header>
        <Action>http://abc.org/mfp/PrintService</Action>
        <MessageID>uuid0a6dc791-2be6-4991-9af1-454778a1917a</MessageID>
        <To>http//abc.org/mfp</To>
        <Security>
                <UsernameToken>
                        <Username>ABCDEF</Username>
                        <Password Type="...#PasswordDigest">
                            1EdZep5nTBtlerlisTo60wRbc==
                        </Password>
                        <Nonce>PsCAjo08nyQiaTlo== </Nonce>
                        <Created>2004-06-30T012345Z</Created>
                </UsernameToken>
        </Security>
</Header>
```

FIG. 5

```
<?xml version="1.0"?>.
<xmlscript name="Sample1">
        <mapping>
                <Service>http://abc.org/mfp/PrintService</Service>
                <AuthService>http://abc.org/mfp/AuthenticationA</AuthService>
        </mapping>
        <mappmg>
                <Service>http://abc.org/mfp/ScanService</Service>      ~ 601
                <AuthService>http://abc.org/mfp/AuthenticationB</AuthService>
        </mapping>
        <mapping>
                <Service>http://abc.org/mfp/StorageService</Service>~ 602
                <AuthService>http://abc.org/mfp/AuthorizationB</AuthService>
        </mapping>
        <mapping>
                <Service>http://abc.org/mfp/FaxService</Service>
                <AuthService>https://zzz.org/server/AuthenticationC</AuthService>
        </mapping>
</xmlscript>
```

FIG. 6

```xml
<?xml version="1.0"?>
<xmlscript name="Sample2">
        <mapping>
                <Service>http://abc.org/mfp/adhocPrinting/PrintService</Service>
                <AuthService>http ://abc.org/mfp/AuthenticationA</AuthService>
        </mapping>
        <mapping>
                <Service>http://abc.org/mfp/ChargedPrint/PrintService</Service>
                <AuthService>https://zzz.org/server/AuthenticationC</AuthService>
        </mapping>
</xmlscript>
```

FIG. 7

```xml
<?xml version="1.0"?>
<xmlscript name="Sample3">
    <mapping>
        <Service>http://abc.org/mfp/ScanService</Service>
        <AuthService>http://abc.org/mfp/AuthenticationA</AuthService>
    </mapping>
    <mapping>
        <Service>http://abc.org/mfp/StorageService</Service>
        <AuthService>http://abc.org/mfp/AuthenticationB</AuthService>
    </mapping>
    <mapping>
        <Service>http://abc.org/mfp/ScanToStorage/ScanService</Service>
        <AuthService>http://zzz.org/server/AuthenticationC</AuthService>
    </mapping>
    <mapping>
        <Service>http://abc.org/mfp/ScanToStorage/StorageService</Service>
        <AuthService>https://zzz.org/server/AuthenticationC</AuthService>
    </mapping>
</xmlscript>
```

FIG. 8

```
<?xml version="1.0"?>.
<xmlscript name="Sample4">
        <mapping>
                <Service>http://abc.org/mfp/PrintService</Service>
                <AuthService>http://abc.org/mfp/AuthenticationA</AuthService>
        </mapping>
        <mapping>
                <Service>http://abc.org/mfp/ScanService</Service>
                <AuthService>http://abc.org/mfp/AuthenticationA</AuthService>
        </mapping>
</xmlscript>
```

FIG. 9

```
<?xml version="1.0" ?>
<xmlscript name="Sample5">
        <mapping>
                <Service>http://abc.org/mfp/PrintService</Service>
                <AuthService>http://abc.org/mfp/AuthenticationB</AuthService>
                <AuthService>http://abc.org/mfp/AuthorizationB</AuthService>
        </mapping>
</xmlscript>
```

FIG. 10

```xml
<?xml version="1.0" ?>
<xmlscript name="Sample6">
    <SecurityPolicy level="1">
        <mapping>
            <Service>http://abc.org/mfp/PrintService</Service>
            <AuthService></AuthService>
        </mapping>
    </SecurityPolicy>
    <SecurityPolicy level="2">
        <mapping>
            <Service>http://abc.org/mfp/PrintService</Service>
            <AuthService>http://abc.org/mfp/AuthenticationA</AuthService>
        </mapping>
    </SecurityPolicy>
    <SecurityPolicy level="3">
        <mapping>
            <Service>http://abc.org/mfp/PrintService</Service>
            <AuthService>http://abc.org/mfp/AuthenticationB</AuthService>
        </mapping>
    </SecurityPolicy>
    <SecurityPolicy level="4">
        <mapping>
            <Service>http://abc.org/mfp/PrintService</Service>
            <AuthService>https://zzz.org/server/AuthenticationC</AuthService>
        </mapping>
    </SecurityPolicy>
</xmlscript>
```

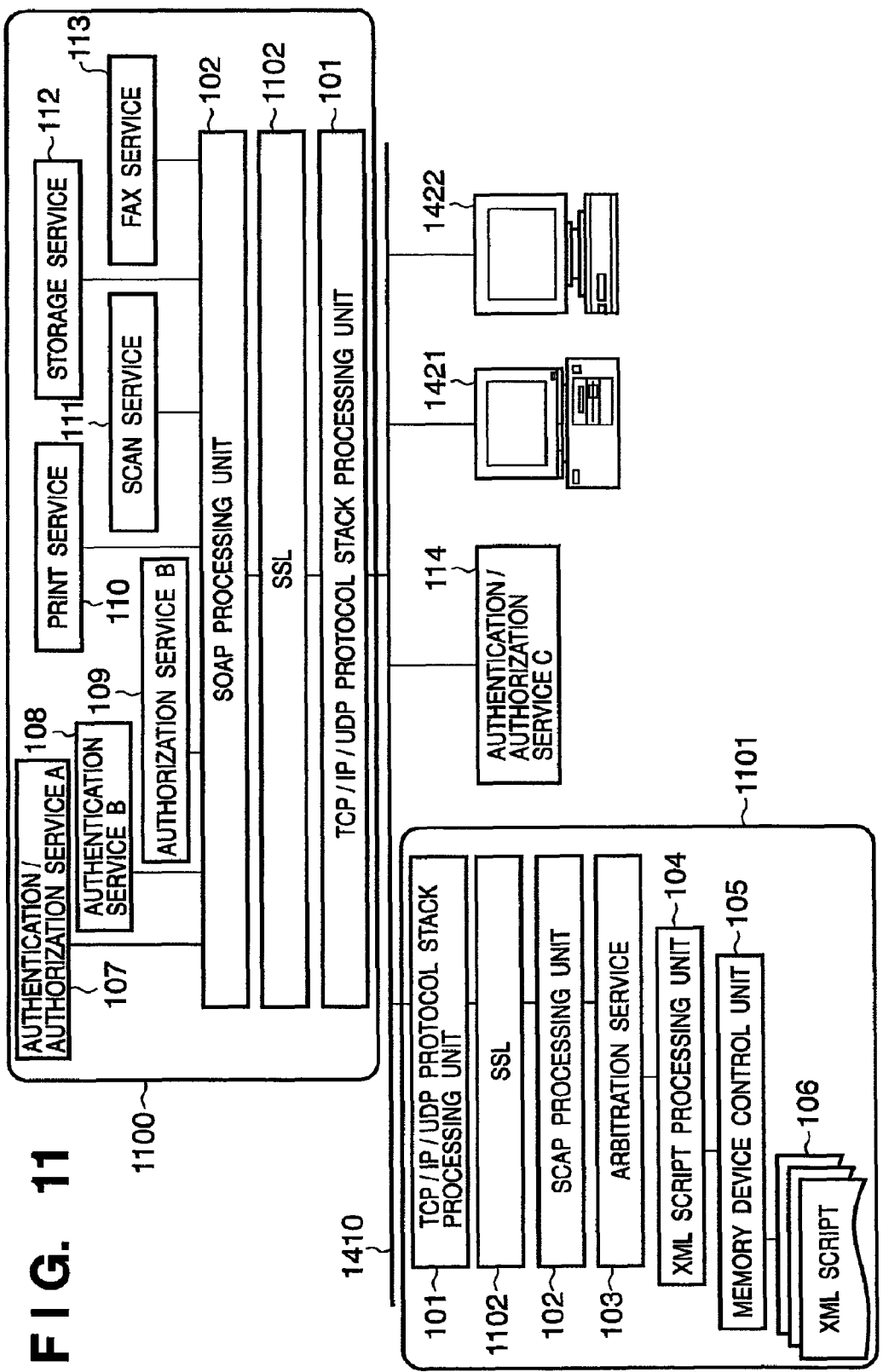

INFORMATION PROCESSING APPARATUS, INFORMATION PROCESSING METHOD, PROGRAM, AND STORAGE MEDIUM

CROSS-REFERENCE TO RELATED APPLICATIONS

This application is a continuation of application Ser. No. 11/220,248, filed Sep. 6, 2005 now U.S. Pat. No. 7,647,319, the entire disclosure of which is hereby incorporated by reference.

FIELD OF THE INVENTION

The present invention relates to authentication processing which is executed for the user who requests a Web service in an information processing apparatus which provides a plurality of Web services via the network.

BACKGROUND OF THE INVENTION

In recent years, XML (eXtensible Markup Language) as a structured language is used in applications such as management, messaging, databases, and the like of business documents, and its application range has increasingly spread.

Its typical example is an application to a Web service as a distributed object model that exploits XML-SOAP (Simple Object Access Protocol). With the advent of this Web service, conversion from the conventional object oriented model to a service oriented architecture (SOA) is gradually being carried out.

The SOA is an architecture that divides processes to have Web services as units, and can reuse and restructure the existing Web services. Hence, business solutions can be quickly built and provided while maintaining high reliability and low cost.

Upon providing business solutions, it is indispensable to build strong security. In the business solutions built on the network, protection of user information and user data, and personal identification and authentication have become important issues. Such issues are no exceptions even in the SOA based on the Web services. Even in an identical Web service, flexibility is required to provide different authentication and authorization processes depending on various conditions such as environments, security levels, system configurations, and the like in which that Web service is used. For example, as for user authentication, the authentication method is wide-ranging, i.e., simple password authentication, authentication using PIN codes, authentication using IC cards, biological authentication, and the like. Hence, it is important to select an appropriate user authentication method in consideration of various conditions.

Meanwhile, in order to improve the convenience and simplicity of network solutions, demands such as Single Sign-On, Federated Identity, and the like are increasing. For example, upon building and providing a new Web service by integrating a plurality of Web services, it is demanded to establish a scheme for providing an environment of Single Sign-On or the like by integrating authentication and authorization processes executed for individual Web services. For this reason, solutions that can meet incompatible requirements, i.e., implementation of strong security and building of network solutions with high convenience and simplicity without impairing the high efficiency and flexibility of the SOA, are required.

The authentication and authorization processes upon providing the conventional Web services will be explained below. FIGS. 12A and 12B are block diagrams showing examples of functional blocks in the conventional authentication and authorization processes. FIG. 12R shows a case wherein individual Web services (services A and B) respectively incorporate authentication and authorization processing units, and databases for holding user authentication information (see Japanese Patent Laid-Open No. 2003-229978 for such configuration). FIG. 12B shows a case wherein each individual Web service externally provides modules that perform authentication and authorization processes, and shares a database for holding user authentication information.

However, when different authentication and authorization processes are required depending on the use cases of Web services to be applied of those described in the prior art, the arrangement shown in FIG. 12A must rebuild the Web services according to requirements, thus imposing a heavy load on the development cost and management cost.

On the other hand, according to the arrangement shown in FIG. 12B, since the database that holds user authentication information for the authentication and authorization processes is shared, the Web services need not be rebuilt according to requirements. However, since each individual Web service individually holds the database, when a new Web service is provided by combining the already developed Web services, it becomes very difficult to provide functions such as Single Sign-On, Federated Identity, and the like, and the system becomes inconvenient for Web service users.

Each individual Web service must mount interfaces and protocols (protocols A and B) with services (authentication service A and authorization service B) that implement the authentication and authorization processes. When different authentication and authorization processes are required in accordance with the user cases of the Web services to be applied, the interfaces and protocols must be rebuilt according to such requirements, and each individual Web service must mount a plurality of interfaces and protocols. Hence, the development cost and management cost are increasing, and quick Web services cannot be provided in accordance with user's requirements.

In addition, these problems also disturb introduction of an optimal security system at an optimal timing, and then become causes of damages due to illicit use.

SUMMARY OF THE INVENTION

The present invention has been made in consideration of the above problems, and has as its object to implement network solutions having high convenience and simplicity with low cost while maintaining strong security, upon providing Web services in an information processing apparatus that provides a plurality of Web services via the network.

In order to achieve the above object, an information processing apparatus according to the present invention comprises the following arrangement. That is, an information processing apparatus which comprises a plurality of providing unit configured to provide a plurality of services, and a plurality of authentication processing unit configured to execute authentication processing of a user who requests to provide the service via a network, comprising:

holding unit configured to hold information which describes association between information pertaining to the providing unit that provide the services, and information pertaining to the authentication processing unit that execute authentication processing upon providing the services; and determination unit configured to search the information for information pertaining to the providing unit that provides a service requested by the user, and determining information pertaining to the authentication processing unit described in association with the providing unit in the information, and in that when the user is authenticated using the authentication processing unit specified by the information pertaining to the authentication processing unit determined by the determination unit, the providing unit that provides the service requested by the user provides the service.

According to the present invention, upon providing Web services in the information processing apparatus that provides a plurality of Web services via the network, network solutions having high convenience and simplicity can be implemented with low cost while maintaining strong security.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3B is a flowchart showing the control flow of an arbitration service;

FIG. 4 shows an example of description contents in a header field of a SOAP request;

FIG. 5 shows a description example of an XML script;

FIG. 6 shows a description example of an XML script;

FIG. 7 shows a description example of an XML script;

FIG. 8 shows a description example of an XML script;

FIG. 9 shows a description example of an XML script;

FIG. 10 shows a description example of an XML script;

FIG. 11 is a block diagram showing the functional arrangement when an arbitration service is allocated in an independent form on the network;

DETAILED DESCRIPTION OF THE PREFERRED EMBODIMENTS

Preferred embodiments of the present invention will now be described in detail in accordance with the accompanying drawings.

Preferred embodiments of the present invention will be described in detail hereinafter with reference to the accompanying drawings as needed. Note that the present invention can be practiced in various apparatuses which provide Web services via a network, and can be applied to various systems. A case will be explained hereinafter wherein the present invention is carried out in a network-compatible MFP (Multi Function Peripheral) and is applied to an image processing system.

First Embodiment

<Overall Arrangement of Image Processing System>

Figure 14:
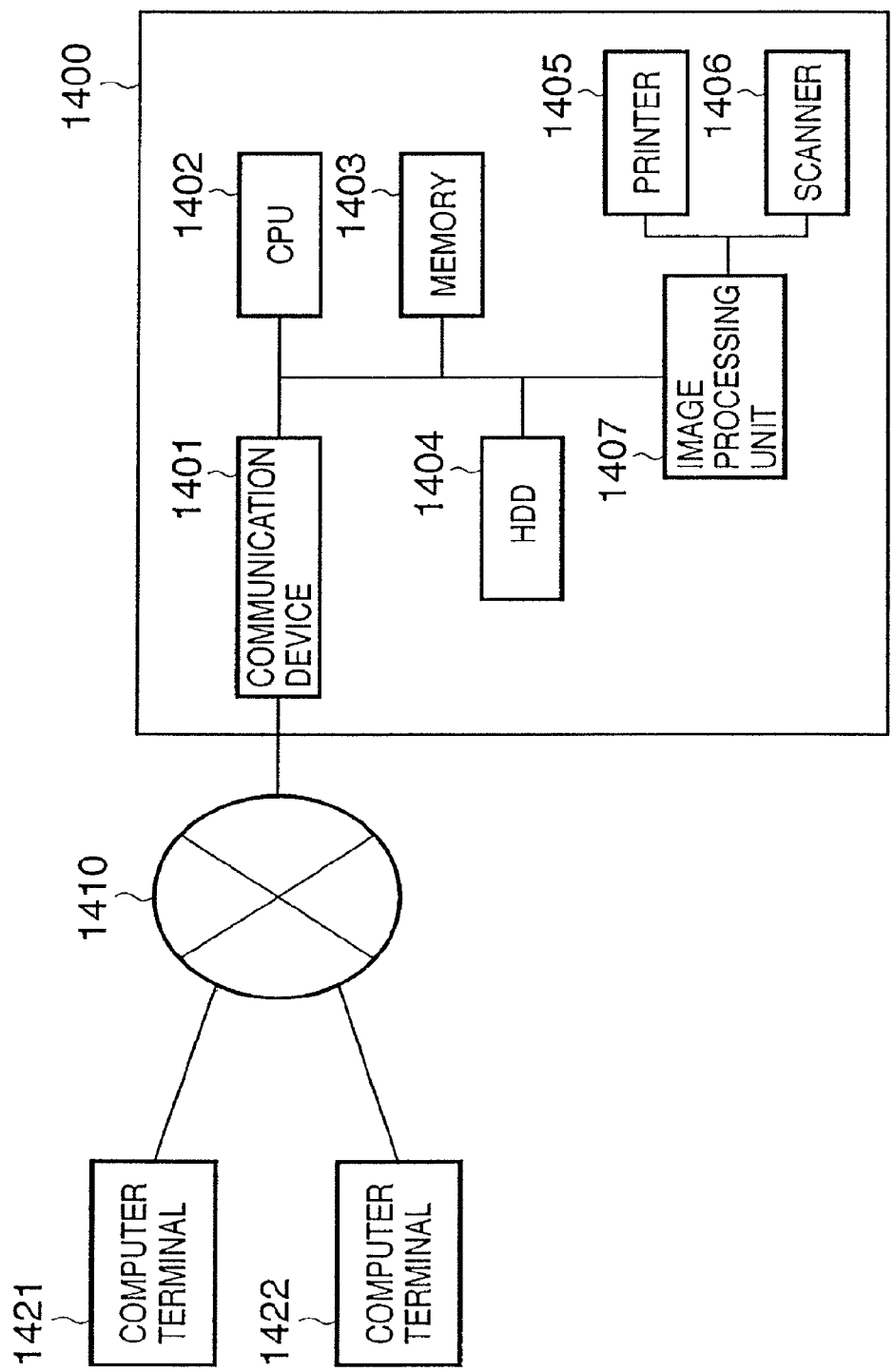
FIG. 14 is a block diagram showing the overall arrangement of an image processing system including the MFP according to the embodiment of the present invention.

FIG. 14 is a block diagram showing the overall arrangement of an image processing system including a network-compatible MFP (to be simply referred to as "MFP" hereinafter) according to the embodiment of the present invention. Referring to FIG. 14, reference numeral 1400 denotes an MFP which provides various Web services such as a print service, scan service, storage service, FAX service, and the like to a computer terminal 1421 which can be connected via a network 1410. Reference numeral 1421 denotes a computer terminal which can utilize the MFP 1400 via the network 1410. Reference numeral 1422 denotes a computer terminal used to manage the MFP 1400.

The MFP 1400 includes hardware components such as a communication device 1401, CPU (central processing unit) 1402, memory 1403, HDD (hard disk drive) 1404, image processing device 1407, printer 1405, scanner 1406, and the like. The MFP 1400 is characterized by having functions of executing security processes such as authentication, authorization, and the like using XML (eXtensible Markup Language) as a structured language.

The communication device 1401 makes communications via the network 1410. The CPU 1402 is a computer for executing programs that implement various functions in the image processing device 1407. More specifically, the CPU 1402 reads out programs (application programs and the like) for implementing various functions from the HDD 1404, and executes the readout programs using the memory 1403 as a work area.

<Functional Arrangement of MFP 1400>

Figure 1:
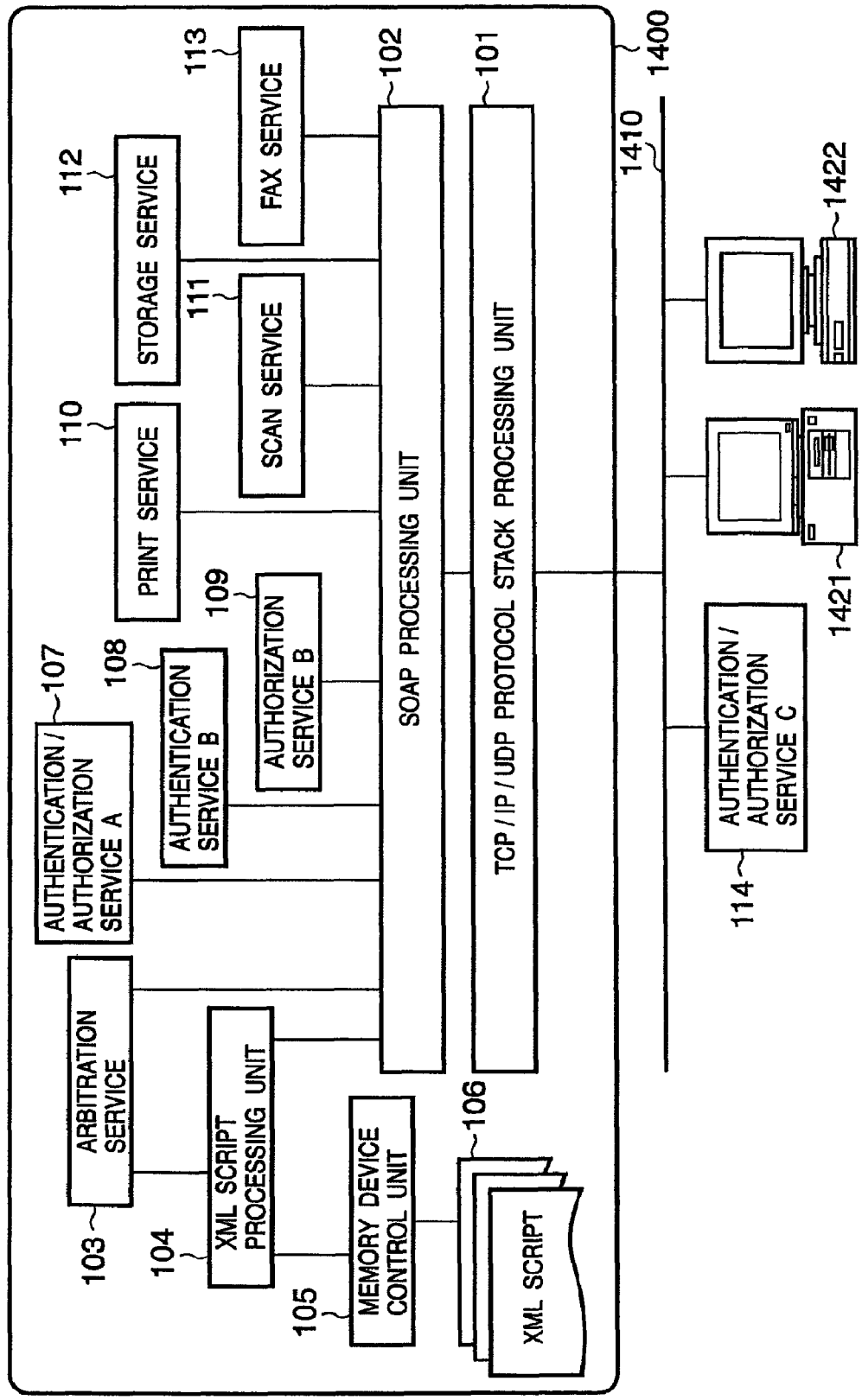
FIG. 1 is a block diagram showing the functional arrangement of an MFP according to an embodiment of the present invention.

The functional arrangement of the MFP 1400 according to this embodiment will be described below using FIG. 1. FIG. 1 is a block diagram showing the functional arrangement of the MFP 1400 according to this embodiment.

The MFP 1400 comprises a TCP/IP/UDP protocol stack processing unit 101 which stacks TCP/IP/UDP protocols as a communication function, comprises a SOAP processing unit 102 as its upper layer, and further comprises an arbitration service 103, XML script processing unit 104, authentication/authorization service A (107), authentication service B (108), authorization service B (109), authentication/authorization service C (114), print service 110, scan service 111, storage service 112, and FAX service 113 as its upper layer. The MFP 1400 provides these Web services (110 to 113) to the computer terminal 1421 via the network 1410.

The system administrator can perform suspension of the Web service function, deletion of a Web service, reinstallation of a Web service, and installation of a new Web service with respect to the MFP 1400 via the computer terminal 1422. Note that the new Web service includes a case wherein a new function is provided by, e.g., combining a plurality of already installed Web services.

The SOAP processing unit 102 has a function of interpreting a received SOAP request, transmitting the description contents of a SOAP header field to the arbitration service 103, generating a SOAP response on the basis of the processing result returned from the arbitration service 103, and returning the SOAP response to the computer terminal 1421 that issued the SOAP request. Also, the SOAP processing unit 102 has a function of transmitting the description contents of a SOAP body to a corresponding Web service on the basis of the processing result returned from the arbitration service 103, generating a SOAP response on the basis of the processing result sent from that Web service, and returning the SOAP response to the computer terminal 1421 that issued the SOAP request.

The arbitration service 103 has a function of interpreting the description contents of the SOAP header field transmitted from the SOAP processing unit 102, and acquiring information that pertains to a Web service which is requested to be executed, and a function of acquiring information that pertains to an authentication/authorization service associated with the Web service which is requested to be executed from an XML script 106 registered on the memory (HDD 1404) managed by a memory device control unit 105.

Furthermore, the arbitration service 103 has a function of transmitting authentication information described in the SOAP header field to the authentication/authorization service (one of 107 to 109) acquired from the XML script 106 on the basis of the acquired information that pertains to the authentication/authorization service, and a function of generating a SOAP response on the basis of the processing result sent from the authentication/authorization service (one of 107 to 109) and sending it to the SOAP processing unit 102.

The MFP 1400 according to this embodiment incorporates the authentication/authorization service A (107), authentication service B (108), and authorization service B (109) as those for implementing the authentication/authorization function. However, the present invention is not limited to this. As shown in FIG. 1, the authentication/authorization service C (114) may be allocated outside the MFP 1400, and may be used via the network 1410. Also, the present invention is not limited to the arrangement in which the arbitration service 103 is incorporated in the MFP 1400, but the arbitration service 103 itself may form an independent node on the network 1410. For example, in this case, the arbitration service itself is mounted in an information processing apparatus such as a computer or the like on the network 1410. Furthermore, the present invention is not limited to the arrangement in which the Web services, i.e., the print service 110, scan service 111, storage service 112, and FAX service 113 are incorporated in the MFP 1400. That is, these Web services may be incorporated in another MFP on the network 1410, or the Web services themselves may form independent nodes on the network. For example, an information processing apparatus such as a computer or the like connected to the network may incorporate various services, or a storage device such as a NAS (Network Attached Storage) may provide a storage service. Also, the types of services are not limited to them.

Each authentication/authorization service (107 to 109) has a function of processing authentication information transmitted from the arbitration service 103, and returning the processing result to the arbitration service 103.

Furthermore, the MFP 1400 according to this embodiment incorporates the print service 110, scan service 111, storage service 112, and FAX service 113. These services are Web services compatible to XML-SOAP. The external computer terminal 1422 managed by the system administrator can suspend, restart, delete, and re-install these Web services, and can also add, start, suspend, and delete new Web services.

The XML script processing unit 104 as the lower layer of the arbitration service 103 has a function of accessing the memory (HDD 1404) via the memory device control unit 105. The memory device control unit 105 controls write access of data in the memory (HDD 1404) which stores an XML script 106 that describes the Web services, information that pertains to the authentication/authorization service for each Web service, and processing sequence, and read access of data from that memory (HDD 1404).

The XML script 106 can be deleted, re-installed, and updated by the external computer terminal 1422 managed by the system administrator, and an identical Web service can be associated with another authentication/authorization service in accordance with the description contents of the XML script 106. Also, an authentication/authorization service can be newly associated with a new Web service which operates in combination of a plurality of Web services, thus flexibly coping with the security requirements.

Upon enjoying a provided Web service, an XML script 106 which describes information pertaining to the authentication/authorization service associated with the Web service which is running on the MFP 1400 must be registered in advance in the MFP 1400.

When this registration process is not executed, and no XML script 106 is available on the memory (HDD 1404) of the MFP 1400, none of Web services which are running on the MFP 1400 can be executed.

This XML script 106 is stored on the memory (HDD 1404) controlled by the memory device control unit 105 when the system administrator executes the registration process for the MFP 1400 via the network 1410.

The system administrator transmits an XML script 106 that describes information pertaining to the authentication/authorization service associated with each Web service incorporated in the MFP 1400 from the computer terminal 1422 managed by him or her to the MFP 1400.

The MFP 1400 according to this embodiment comprises the following XML-SOAP RPC (Remote Procedure Call) so as to register/delete the XML script 106. With this XML-SOAP RPC, the XML script processing unit 104 can register/delete the XML script 106 and can enable the XML script 106. More specifically, upon transmitting/registering the XML script 106 to the MFP 1400, UploadScript (scriptName, account, password) as a SOAP function is used.

Since the MFP 1400 has an arrangement that can register a plurality of XML scripts 106, "scriptName" is used as their identification information. In this embodiment, an ASCII character string up to 32 characters can be used. Note that an ASCII character string up to 32 characters is used for each of "account" and "password". Assume that such identification information is already registered in the MFP 1400 in advance, is recorded on the memory (HDD 1404) managed by the memory device control unit 105, and is known to only the system administrator. The XML script 106 as XML data is transmitted to the MFP 1400 in the form of an attached file of a SOAP request that describes the above SOAP function.

In order to delete the XML script 106 already registered in the MFP 1400, DeleteScript (scriptName, account, password) as a SOAP function is used. Assume that only the system administrator who knows "account" and "password" information can delete the XML script 106 registered on the memory (HDD 1404) of the MFP 1400. Since the MFP 1400 can register a plurality of XML scripts 106, an XML script 106 to be deleted is designated using "scriptName".

In order to enable the XML script 106 designated by "scriptName" of a plurality of XML scripts 106 registered in the MFP 1400, EnableScript (scriptName, account, password) as a SOAP function is used. Also, assume that only the system administrator who knows "account" and "password" information can designate and enable an XML script 106 registered on the memory (HDD 1404) of the MFP 1400.

<Registration, Deletion, and Enabling Processes of XML Script>

Figure 2:
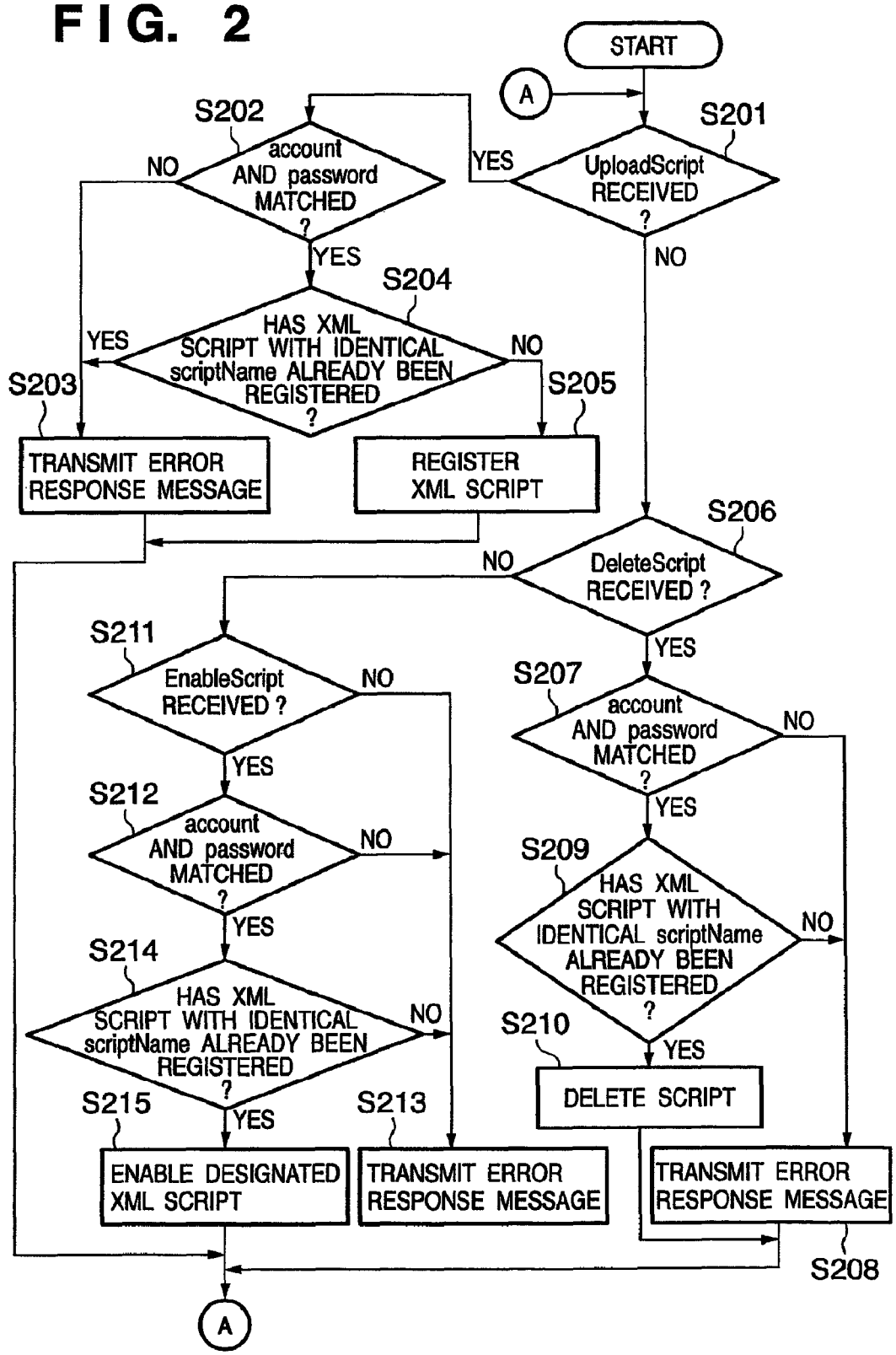
FIG. 2 is a flowchart showing the flow of registration, deletion, and enabling processes of an XML script in the MFP according to the embodiment of the present invention.

The flow of the registration, deletion, and enabling processes of an XML script 106 will be described below using FIG. 2. FIG. 2 is a flowchart showing the flow of the registration, deletion, and enabling processes of an XML script 106 in the MFP 1400 according to this embodiment.

As the precondition of the process shown in FIG. 2, assume that the computer terminal 1422 as an external device transmits an XML script 106 to the MFP 1400.

As shown in FIG. 2, the XML script processing unit 104 which forms the arbitration service 103 checks if UploadScript as a SOAP request is received via the SOAP processing unit 102 (step S201). If it is determined that UploadScript as the SOAP request is received, the XML script processing unit 104 checks if "account" and "password" as its arguments match information (to be referred to as account information hereinafter) recorded on the memory (HDD 1404) via the memory device control unit 105, so as to confirm their contents (step S202).

If it is determined that the two pieces of account information do not match ("NO" in step S202), the XML script processing unit 104 returns an error response message to the computer terminal 1422 via the SOAP processing unit 102 (step S203). On the other hand, if it is determined that the two pieces of account information match ("YES" in step S202), the XML script processing unit 104 checks if an XML script 106 having identical "scriptName" has already been registered (step S204).

If it is determined that the XML script 106 having identical "scriptName" has already been registered ("YES" in step S204), the XML script processing unit 104 returns an error response message to the computer terminal 1422 via the SOAP processing unit 102 (step S203), and the flow returns to step S201 in FIG. 2. Note that the system administrator cannot register an XML script having identical "scriptName" in this case unless he or she deletes the already registered XML script using DeleteScript.

If it is determined that no XML script with identical "scriptName" has already been registered ("NO" in step S204), the XML script processing unit 104 records an XML script transmitted in the form of an attached file of the SOAP request on the memory (HDD 1404) via the memory device control unit 105 (step S205).

If it is determined in step S201 that no UploadScript as the SOAP request is received ("NO" in step S201), the XML script processing unit 104 checks if DeleteScript as a SOAP request is received via the SOAP processing unit 102 (step S206). If it is determined that DeleteScript as the SOAP request is received ("YES" in step S206), the XML script processing unit 104 checks if "account" and "password" as its arguments match account information recorded on the memory (HDD 1404) via the memory device control unit 105, so as to confirm their contents (step S207).

If it is determined in step 5207 that the two pieces of account information do not match, the XML script processing unit 104 returns an error response message to the computer terminal 1422 via the SOAP processing unit 102 (step S208). On the other hand, if it is determined that the two pieces of account information match ("YES" in step S207), the XML script processing unit 104 checks if an XML script having identical "scriptName" has already been registered (step S209).

If it is determined in step S209 that no XML script with the designated "scriptName" is recorded on the memory 1403 (it has not already been registered) ("NO" in step S209), the XML script processing unit 104 returns an error response message to the computer terminal 1422 via the SOAP processing unit 102 (step S208). On the other hand, if it is determined that the XML script with the designated "scriptName" is recorded on the memory (HDD 1404) (it has already been registered) ("YES" in step S209), the XML script processing unit 104 deletes the XML script recorded on the memory (HDD 1404) via the memory device control unit 105 (step S210).

If it is determined in step S206 that no DeleteScript as the SOAP request is received, the XML script processing unit 104 checks if EnableScript as a SOAP request is received via the SOAP processing unit 102 (step S211). If it is determined that EnableScript as the SOAP request is received ("YES" in step S211), the XML script processing unit 104 checks if "account" and "password" as its arguments match account information recorded on the memory (HDD 1404) via the memory device control unit 105, so as to confirm their contents (step S212).

If it is determined in step S212 that the two pieces of account information do not match, the XML script processing unit 104 returns an error response message to the computer terminal 1422 via the SOAP processing unit 102 (step S213). On the other hand, if it is determined that the two pieces of account information match ("YES" in step S212), the XML script processing unit 104 checks if an XML script with the designated "scriptName" has already been registered (step S214).

If it is determined in step S214 that no XML script with the designated "scriptName" is recorded on the memory 1403 (it has not already been registered) ("NO" in step S214), the XML script processing unit 104 returns an error response message to the computer terminal 1422 via the SOAP processing unit 102 (step S213). On the other hand, if it is determined that the XML script with the designated "scriptName" is recorded on the memory 1403 (it has already been registered) ("YES" in step S214), the XML script processing unit 104 enables the XML script with the designated "scriptName" (step S215), and the arbitration service 103 subsequently refers to that XML script.

With the above processes, the registration, deletion, and enabling processes of an XML script according to an application from the computer terminal 1422 to the MFP 1400 are complete. The system administrator can repetitively execute the registration, deletion, and enabling processes of an XML script of the corresponding application as needed. Upon completion of the registration process of the XML script, the arbitration service 103 in the MEP 1400 is ready to run.

<Processes of Respective Units Upon Reception of SOAP Request to Web Service>

Figure 13:
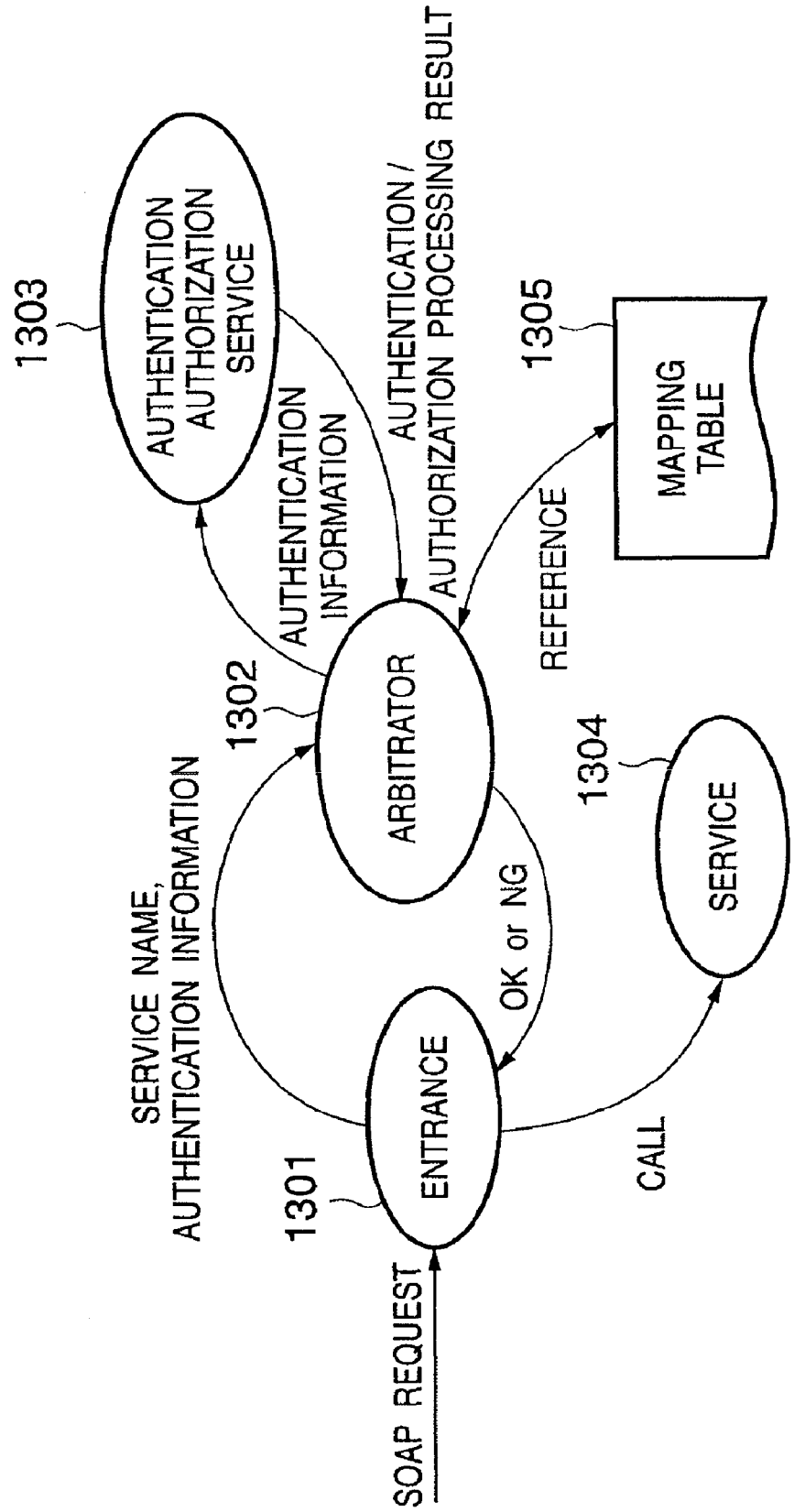
FIG. 13 is a chart showing the flow of processes in the MFP upon reception of a SOAP request to a Web service.

The processes of respective units upon reception of a SOAP request to a Web service from the computer terminal 1421 in the MFP 1400 according to this embodiment will be described below. An overview of the processes will be explained first. FIG. 13 is a chart showing the flow of the processes in the MFP 1400 upon reception of a SOAP request to a Web service.

Figure 3A:
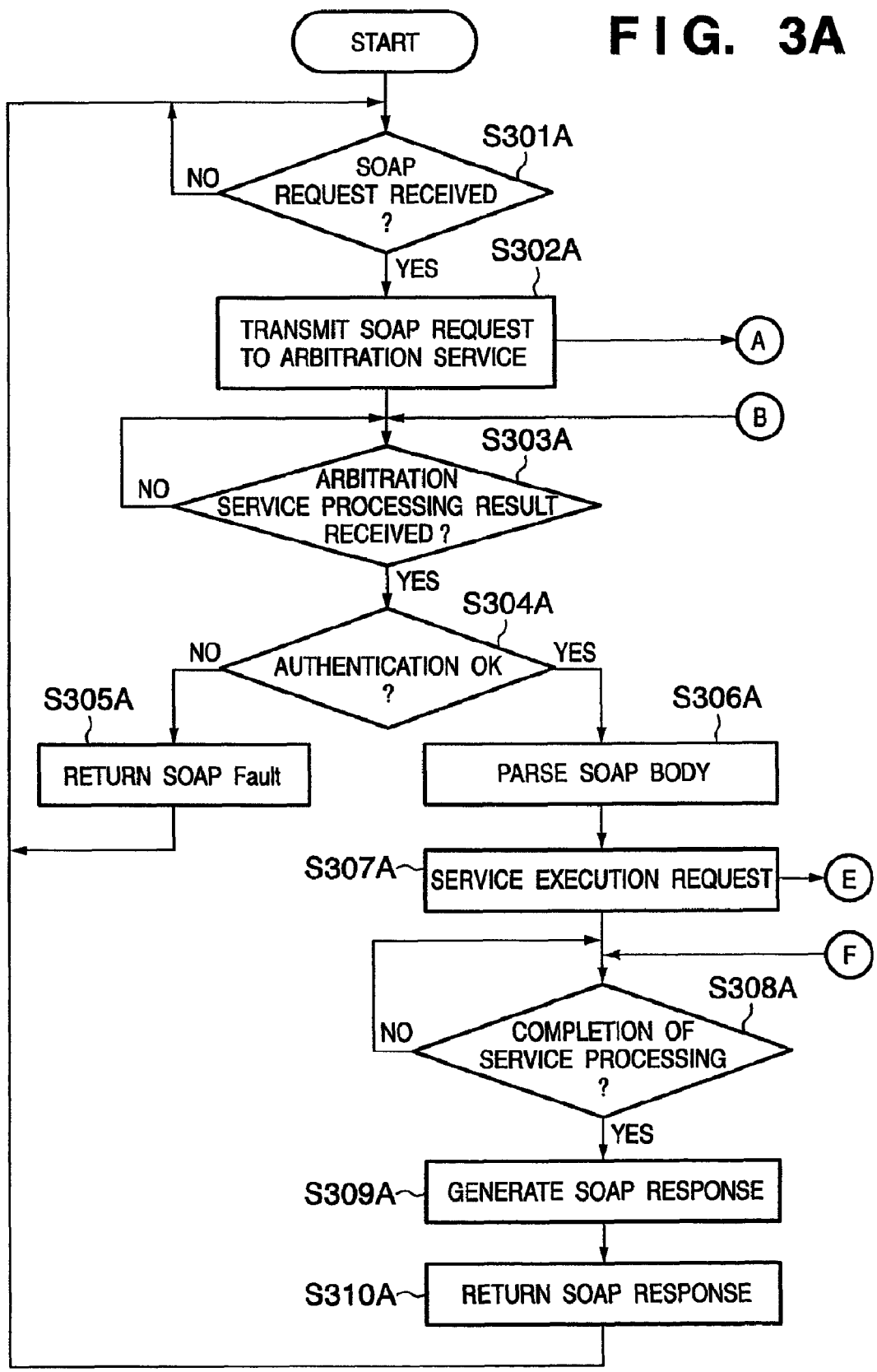
FIG. 3A is a flowchart showing the control flow of a SOAP processing unit.

As shown in FIG. 13, upon reception of a SOAP request to a Web service from the computer terminal 1421, an ENTRANCE 1301 notifies an ARBITRATOR 1302 of the service name and authentication information of the request destination. Note that the ENTRANCE 1301 corresponds to the SOAP processing unit 102 in FIG. 1, and FIG. 3A is a flowchart showing its control flow. Also, the ARBITRATOR 1302 corresponds to the arbitration service 103 in FIG. 1, and FIG. 3B is a flowchart showing its control flow.

The ARBITRATOR 1302 refers to a MAPPING TABLE 1305 and acquires information pertaining to a authentication/authorization service associated with the requested Web service. Note that the MAPPING TABLE 1305 corresponds to the XML script 106 in FIG. 1.

Figure 3C:
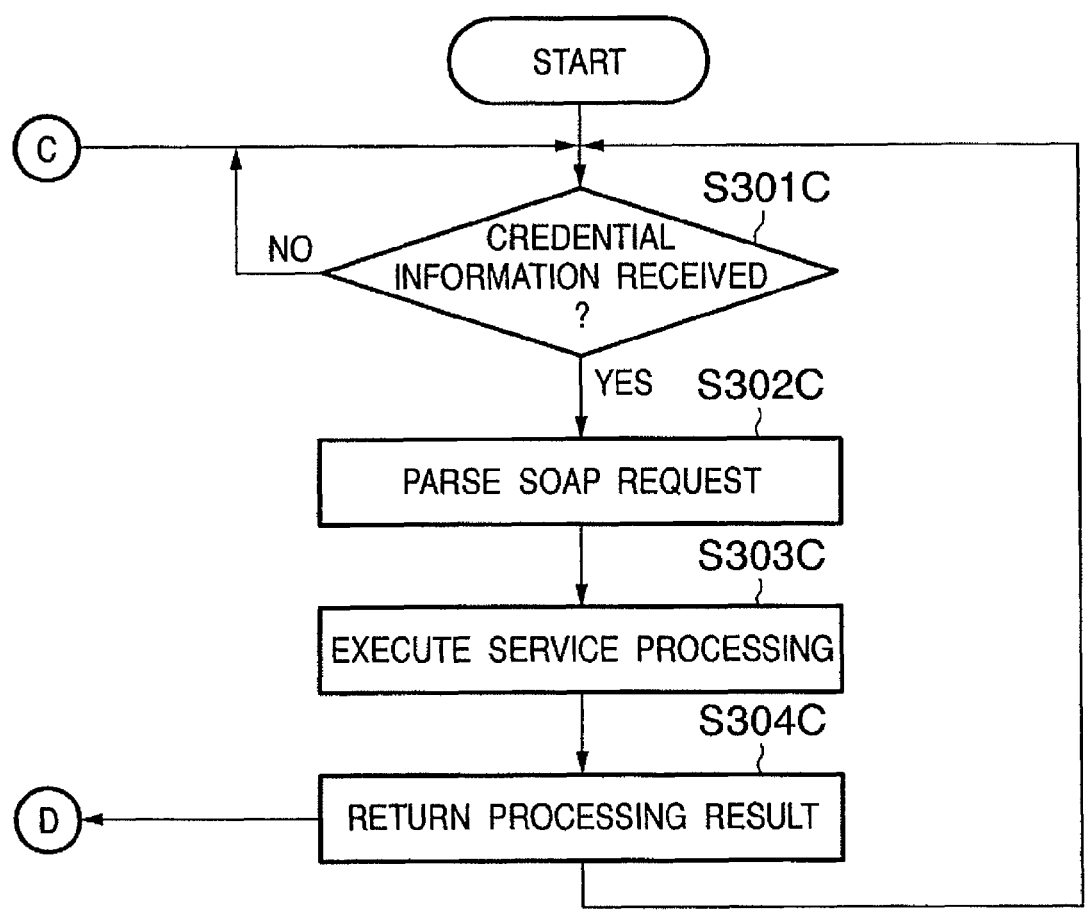
FIG. 3C is a flowchart showing the control flow of an authentication/authorization service.

The ARBITRATOR 1302 notifies a corresponding AUTHENTICATION/AUTHORIZATION SERVICE 1303 of the authentication information received from the ENTRANCE 1301 on the basis of the acquired information pertaining to the authentication/authorization service. Note that the AUTHENTICATION/AUTHORIZATION SERVICE 1303 corresponds to the authentication/authorization services 107, 108, 109, and 114 in FIG. 1, and FIG. 3C is a flowchart showing its control flow.

The authentication/authorization processing result in the AUTHENTICATION/AUTHORIZATION SERVICE 1303 is returned to the ARBITRATOR 1302, which transmits availability of execution of the Web service or access control information to the ENTRANCE 1301 on the basis of the processing result.

Figure 3D:
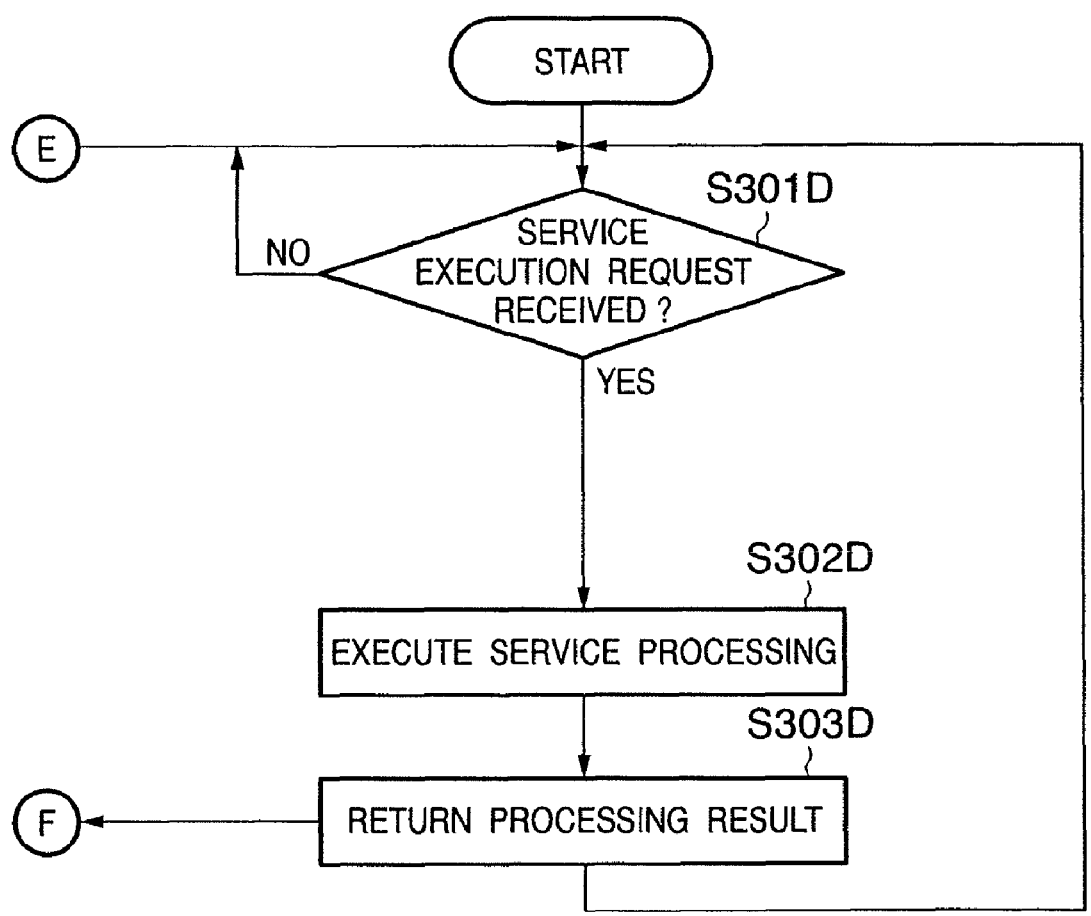
FIG. 3D is a flowchart showing the control flow of a Web service.
Figure 12A:
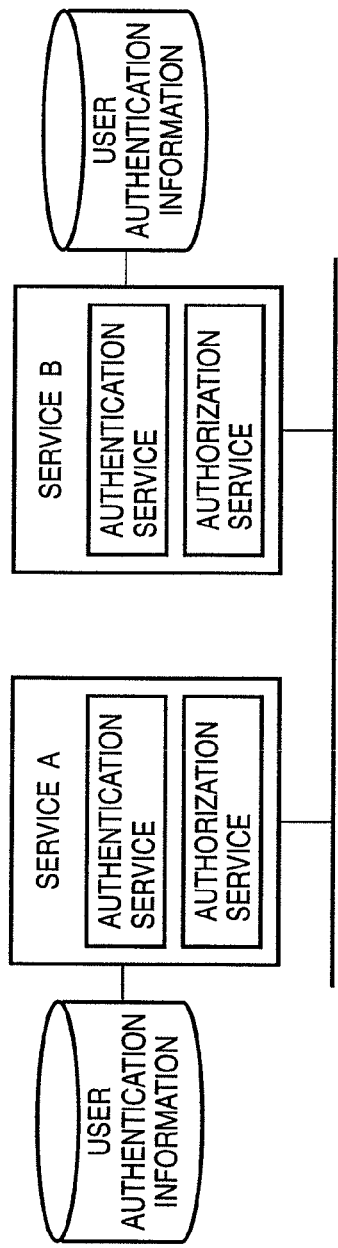
FIGS. 12A and 12B are block diagrams showing the arrangements of Web services and authentication and authorization processes in the existing technique.
Figure 12B:
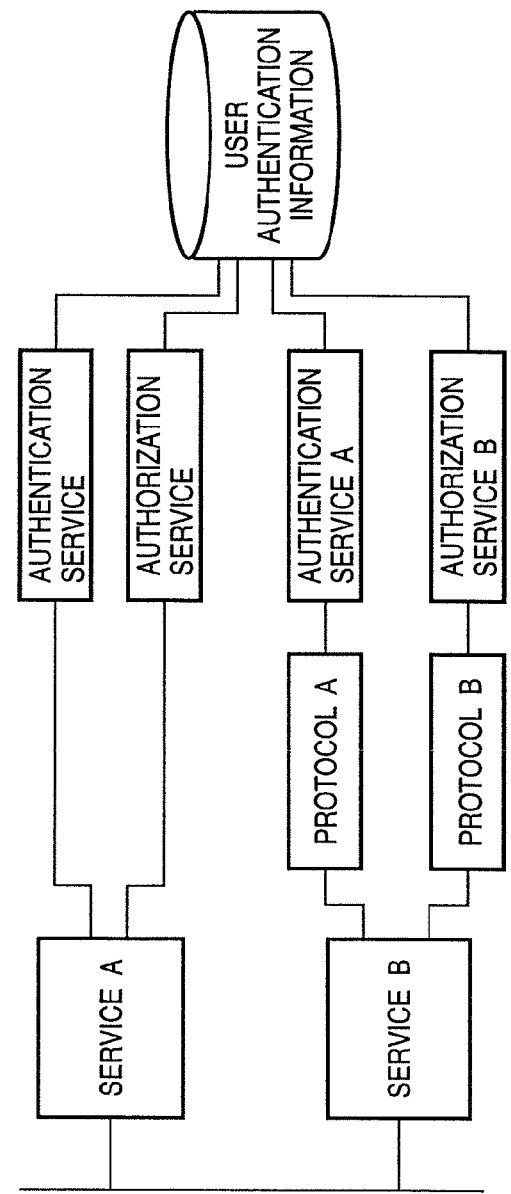

On the basis of the contents transmitted from the ARBITRATOR 1302, the ENTRANCE 1301 calls a requested SERVICE 1304 or notifies the computer terminal 1421 as a request source of a message indicating that execution of the Web service is denied. Note that the SERVICE 1304 corresponds to the print service 110, scan service 111, storage service 112, and FAX service 113 as respective Web services in FIG. 1, and FIG. 3D is a flowchart showing its control flow. The flows of the control of the respective units will be described in detail below with reference to these flowcharts.

As shown in FIG. 3A, while the MFP 1400 is active, the SOAP processing unit 102 always monitors reception of a SOAP request to a Web service transmitted from the external computer terminal 1421 via the TCP/IP/UDP protocol stack 101 (step S301A). If reception of the SOAP request to a Web service is confirmed ("YES" in step S301A), the SOAP processing unit 102 transmits the header field of the received SOAP request to the arbitration service 103 (step S302A).

As shown in FIG. 3B, the arbitration service 103 always monitors reception of the header field of the SOAP request (step S301B). Upon reception of the header field of the SOAP request from the SOAP processing unit 102 ("YES" in step S301B), the arbitration service 103 parses the description contents of the header field of the SOAP request (step S302B).

FIG. 4 shows an example of the header field of the SOAP request. As shown in FIG. 4, the header field of the SOAP request describes the service name of the Web service to be requested as the contents of an <ACTION> tag on the basis of the WSAddressing specification (e.g., see http://schemas.xmlsoap.org/ws/2003/03/addressing/) which are collectively formulated by Microsoft, BEA, IBM, and the like. Also, the header field of the SOAP request describes authentication information as the contents of a <UsernameToken> tag on the basis of the WS-Security UsernameToken Profile 1.0 specification formulated by the standards organization OASIS.

The arbitration service 103 parses the header field of the SOAP request, and checks the presence/absence of the <ACTION> tag and its contents (step S303B). If no <ACTION> tag is described, or if the <ACTION> tag has no contents, i.e., it is an empty tag even if it is present ("NO" in step S303B), the arbitration service 103 determines an illicit request, and notifies the SOAP processing unit 102 of an error (step S304B).

On the other hand, if the contents of the <ACTION> tag are present ("YES" in step S303B), the arbitration service 103 reads out the XML script 106, which is enabled by Enable-Script in advance, via the memory device control unit 105, and searches if the Web service described as the contents of the <ACTION> tag is described in that XML script 106 (step S305B). As a result of search, if no registration corresponding to the Web service described in the <ACTION> tag is found ("NO" in step S306B), the arbitration service 103 determines an illicit request, and notifies an error (step S307B).

On the other hand, if the registration corresponding to the Web service described in the <ACTION> tag is found as a result of search ("YES" in step S306B), the presence/absence of information pertaining to an authentication/authorization service associated with the designated Web service is searched for (step S308B). If no information pertaining to an authentication/authorization service associated with the designated Web service is found in the XML script as a result of search ("NO" in step S308B), the arbitration service 103 determines that the authentication and authorization processes for that Web service are unnecessary, and notifies permission of execution (step S309B).

On the other hand, if the information pertaining to an authentication/authorization service associated with the designated Web service is found in the XML script as a result of search ("YES" in step S308B), credential information (in this case, UsernameToken information) is sent to the URL described in the XML script 106 (step S310B). Note that SAML (Security Assertion Markup Language) 1.1 formulated by the standards organization OASIS is used as a communication protocol with the authentication/authorization service (107 to 109).

As shown in FIG. 3C, upon reception of the credential information from the arbitration service 103 in step S301C, the authentication/authorization service (one of 107 to 109) parses the description contents of the SOAP request (step S302C) to acquire UsernameToken information, and executes the authentication/authorization process on the basis of that information (step S303C). The authentication/authorization service generates a SOAP request according to SAML (Security Assertion Markup Language) 1.1 on the basis of the processing result, and returns it to the arbitration service 103 (step S304C). Upon completion of the return process, the authentication/authorization service (107 to 109) returns to the reception waiting state of credential information from the arbitration service 103 (step S301C).

Referring back to FIG. 3B, in step S311B the arbitration service 103 waits for reception of the authentication result from the authentication/authorization service. Upon reception of the authentication result, the arbitration service 103 confirms if the XML script 106 subsequently describes a call procedure of the authentication/authorization service (step S312B). If such description is found, the arbitration service 103 repeats the processes in steps S310B to S312B.

On the other hand, if the description in the XML script 106 ends ("NO" in step S312B), the arbitration service 103 returns the authentication result to the SOAP processing unit 102 (step S313B). Upon completion of the return process, the arbitration service 103 returns to the reception waiting state of a SOAP header from the SOAP processing unit 102 (step S301B).

In this way, the arbitration service 103 calls the authentication/authorization service (one of 107 to 109) associated with the Web service which is designated to be executed from the computer terminal 1421 in accordance with the description of the XML script 106. Hence, different authentication/authorization services can be executed depending on the description contents of the XML script 106. The description contents of the XML script 106 will be briefly described below.

In the XML script 106, an attribute "name" in an <xml-script> tag describes a file name that identifies the XML script. The file name is set by "scriptName" designated by the aforementioned UploadScript function. As child tags of a <mapping> tag, a <Service> tag which describes information pertaining to the target Web service in the URL format and an <AuthService> tag which describes information pertaining to an authentication/authorization service associated with that Web service in the URL format are defined.

FIG. 5 shows a practical example of an XML script. In case of the XML script shown in FIG. 5, its file name is "Sample1", and that script describes the authentication/authorization service A (107) in association with the print service 110, the authentication service B (108) in association with the scan service 111, the authorization service B (109) in association with the storage service 112, and the authentication/authorization service C (114) in association with the FAX service 113. With this script, the arbitration service 103 executes different authentication/authorization services for respective Web services, respectively. As a result, different authentication/authorization processes can be executed like password authentication for the print service 110, PIN code authentication for the scan service 111, and IC card authentication for the FAX service 113.

Also, according to an XML script shown in FIG. 6, different authentication/authorization processes can be executed for the identical print service 110. An adhoc print service (601) defined in this script is a Web service that provides a simple print function to the computer terminal 1421 connected to the network 1410, and the authentication/authorization service A (107) incorporated in the MFP 1400 executes the authentication/authorization process. Also, for a Web service defined as a charge print service (602), the authentication/authorization service C (114) which is active outside the MFP 1400 via the network 1410 executes the authentication/authorization process.

With such description, two different authentication/authorization services can be selectively used when, for example, the authentication/authorization service A (107) is a simple authentication/authorization service based on a division code, and the authentication/authorization service C (114) is an authentication/authorization service with high secure level based on a credit card number, identification number, and runtime password.

When a scan-storage service as a new Web service is to be provided by combining the scan service 111 and storage service 112 which respectively function solely, the authentication/authorization service A (107) and authentication service B (108) can be respectively associated with the scan service 111 and storage service 112, and the authentication/authorization service C (114) can be associated with the scan-storage service as the new Web service, as shown in FIG. 7.

In an XML script shown in FIG. 8, since the authentication/authorization service A (107) is associated with both the print service 110 and scan service 111, and these two Web services are processed on the basis of a database managed by the authentication/authorization service C (114), the authentication/authorization process can be applied to users who use these two Web services on the basis of identical credential information (i.e., Single Sign-On can be executed for the print service 110 and scan service 111).

On the other hand, an XML script shown in FIG. 9 describes the authentication service B (108) and authorization service B (109) in association with the print service 110. In this case, the arbitration service 103 calls the authentication and authorization services in the order described in the XML script. For this reason, the authentication service B (108) executes an authentication process, and an assertion granted by the authentication service (108) is sent to the authorization service B (109) as the next process, thus receiving authority information granted. More specifically, when multiple authentication processes must be executed or when the authentication and authorization processes are separated, and their combination must be changed depending on the use cases, the XML script shown in FIG. 9 is described and registered.

In this embodiment, a plurality of XML scripts described in the above examples can be registered, and the association process of the Web services and authentication/authorization services is executed in accordance with the description of the XML script designated by EnableScript. Therefore, by only changing the description of the XML script, the authentication/authorization process to be executed can be changed or updated in correspondence with the use case.

Referring back to FIG. 3A, upon reception of the processing result from the arbitration service 103 (step S303A), the SOAP processing unit 102 interprets the processing result (step S304A). If the authentication result is NG ("NO" in step S304A), the SOAP processing unit 102 returns SOAP Fault as an illicit request to the computer terminal 1421 (step S305A).

On the other hand, if the authentication result is OK ("YES" in step S304A), the SOAP processing unit 102 parses service attribute information described in the SOAP body field (step S306A), reads attribute information for the corresponding Web service (one of 110 to 113), notifies the Web service of the attribute information, and issues an execution request of the Web service (step S307A).

As shown in FIG. 3D, upon reception of the Web service execution request from the SOAP processing unit 102, the Web service (one of 110 to 113) executes a Web service process on the basis of the notified attribute information (step S302D), and returns the processing result to the SOAP processing unit 102 (step S303D). After the processing result is returned, the Web service returns to the reception waiting state of a Web service execution request from the SOAP processing unit 102 (step S301D).

Referring back to FIG. 3A, upon reception of the processing result from the Web service (step S308A), the SOAP processing unit 102 generates a SOAP response on the basis of that processing result (step S309A). In this case, when additional information such as assertion information or the like to be returned to the computer terminal 1421 has already been received from the authentication/authorization service via the arbitration service 103, that information is described in a SOAP header field. Upon completion of generation of the SOAP response, the SOAP processing unit 102 returns the SOAP response to the computer terminal 1421 (step S310A). After the SOAP response is returned, the SOAP processing unit 102 returns to the reception waiting state of a SOAP request from the computer terminal 1421 (step S301A).

By repeating a series of processes described above, the authentication/authorization processes for the requested Web service can be executed.

As can be seen from the above description, according to this embodiment, by only changing the description contents of the XML script as the MAPPING TABLE, other authentication/authorization services can be associated with an identical Web service, or an authentication/authorization service can be newly assigned to a new Web service which functions by combining a plurality of Web services, thus flexibly coping with the security requirements. That is, even when different authentication/authorization processes are requested according to the use cases of the Web service to be applied as in the prior art, the Web service itself need not be rebuilt in accordance with the request, but such different processes can be coped with by only changing the description contents of the XML script. Hence, strong security equivalent to the prior art can be realized with lower cost than the prior art.

By changing the description contents of the XML script as the MAPPING TABLE, Single Sign-On can be applied to a plurality of Web services. Hence, according to this embodiment, network solutions with high convenience and simplicity can be provided.

Second Embodiment

In the first embodiment, upon registering the XML script that describes association between the Web services and authentication/authorization services, an external device, i.e., the computer terminal 1421 managed by the system administrator, transmits and registers the XML script to the XML script processing unit 104 via the network 1410. However, the present invention is not limited to such specific embodiment.

For example, the computer terminal managed by the system administrator may transmit and register the URL of a server, where the XML script is registered, to the XML script processing unit, which may download the XML script from the server having that URL and may register the downloaded XML script on a memory managed by itself.

The computer terminal and MFP may be connected via a local interface such as USB, IEEE1394, or the like, and the XML script may be registered in the XML script processing unit via that interface.

Also, the XML script may be recorded in a recording medium such as a CD-ROM, Compact Flash®, memory stick, or the like, and the XML script processing unit of the MFP may load the XML script via such recording medium.

Furthermore, the authorized system administrator may input the XML script via an operation unit of the MFP.

In the first embodiment, information pertaining to the Web services, and information pertaining to the authentication/authorization services associated with the Web services are described in the format of an XML script, but they may be described using other script description languages or simple text data.

In the first embodiment, the XML script processing unit manages a plurality of XML scripts, and the description of the designated XML script is enabled. However, one XML script may describe a plurality of patterns, and one of these patterns to be adopted may be designated, thus realizing the same effects.

As shown in FIG. 10, different authentication/authorization services may be assigned to the print service in correspondence with different security levels. In this way, the authorized administrator can change the print service that does not require any authentication process to a print service that requires IC card authentication, or to a print service that grants different use limitations for respective users.

In the first embodiment, the arbitration service 103 is incorporated in the node of the MFP. However, as shown in FIG. 11, a logical unit that implements an arbitration service function may be independently connected via the network 1410, e.g., it may be independently incorporated in a server (1101) using a PC. In this case, a communication between the logical unit that implements the arbitration service function and a network-compatible device (1100) must use means such as SSL (Secure Socket Layer), so that the processing result of the authentication/authorization service must be prevented from being tampered with by a third party.

In the first embodiment, the arbitration service and authentication/authorization services communicate with each other using the SAML protocol. However, that protocol may be those which are unique to the respective authentication/authorization services, and the arbitration service may communicate with the authentication/authorization services on the basis of the corresponding protocols. Even in this case, the Web service can execute authentication/authorization processes optimal to respective use cases irrespective of the presence of the authentication/authorization services.

In the example described in the first embodiment, the service name of the Web service to be requested is described based on the WSAddressing specification. However, when the arbitration service cannot detect any <ACTION> tag, it may parse the SOAP body field and may acquire the service name described in the SOAP body field.

In the example described in the first embodiment, the authentication information is described based on the specification of the OASIS WS-Security UsernameToken Profile. However, the present invention is not particularly limited to this. For example, credential information which is not defined in such standard specification may be used. In this case, the XML script may describe correspondence between a tag and credential information, thus coping with and carrying out such modification.

Third Embodiment

The information processing apparatus according to the first and second embodiments can implement network solutions with high convenience and simplicity with low cost while maintaining strong security upon providing Web services.

However, in case of the aforementioned information processing apparatus, since the ARBITRATOR 1302 acquires information pertaining to an authentication/authorization service for a requested Web service with reference to the MAPPING TABLE 1305, the MAPPING TABLE 1305 must be sequentially updated upon adding/deleting Web services.

Such problem may be solved when the administrator of the ARBITRATOR 1302 manually updates the MAPPING TABLE 1305. However, the administrator must check update information of Web services and must execute update operations each time a Web service is updated. In addition, the update operations are troublesome, and the management cost is high.

Furthermore, since the update process of the MAPPING TABLE 1305 is executed according to the administrator's convenience, reflection of information of new addition/deletion of Web services becomes slow, thus distributing introduction of an optimal security system at an optimal timing, and causing damages due to illicit use.

Hence, the embodiment to be described below will explain an information processing apparatus which realizes flexible, strong security by utilizing a service oriented architecture based on Web services, and further aims at speeding up and simplifying management operations including addition/deletion of Web services, and attaining a management cost reduction.

<Overall Arrangement of Image Processing System>

Since the overall arrangement of the image processing system of this embodiment is the same as that (FIG. 14) explained in the first embodiment, a description thereof will be omitted.

<Functional Arrangement of MFP 1400>

Figure 15:
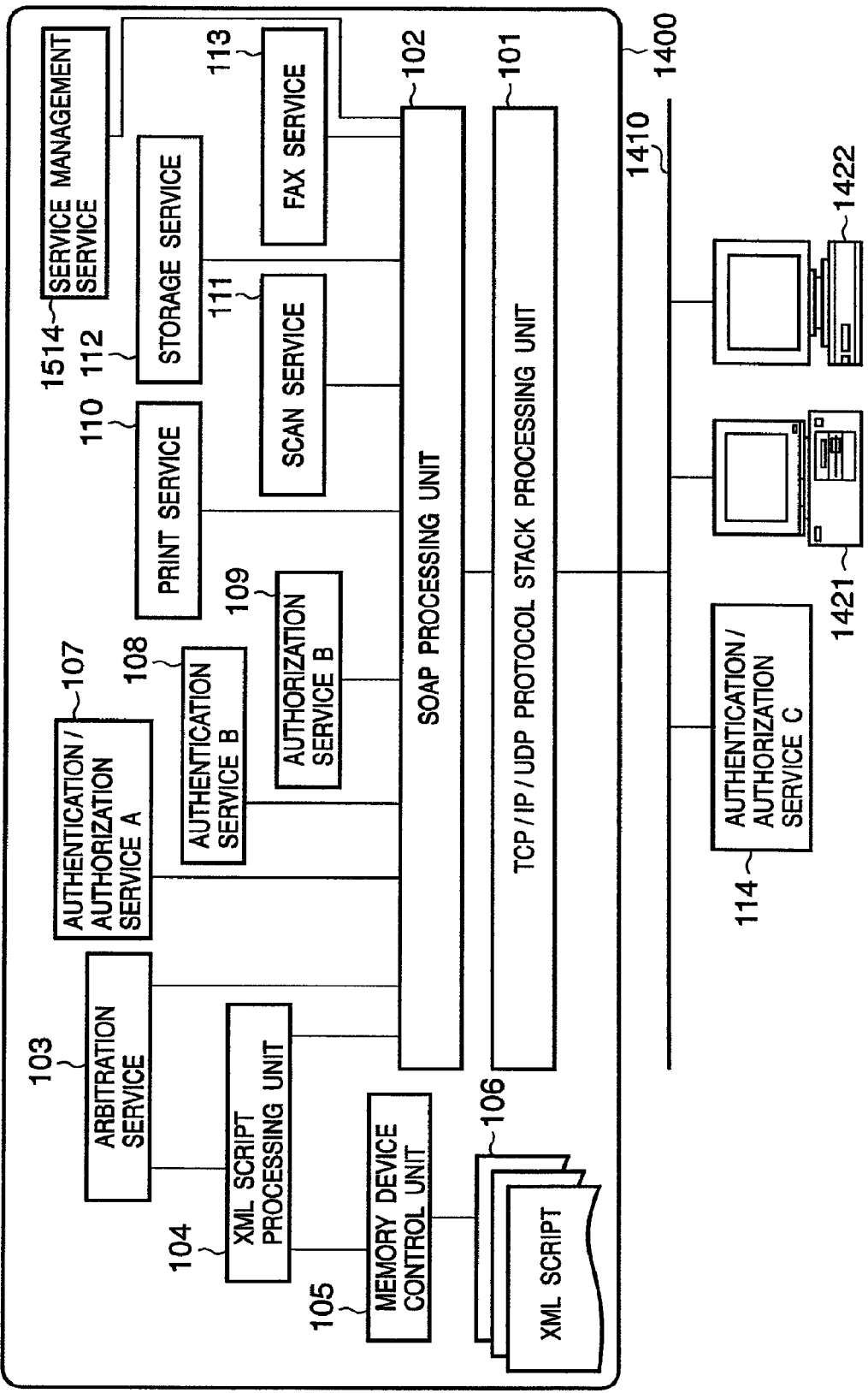
FIG. 15 is a block diagram showing the functional arrangement of the MFP according to another embodiment of the present invention.

The functional arrangement of the MFP 1400 according to this embodiment will be described below using FIG. 15. FIG. 15 is a block diagram showing the functional arrangement of the MFP 1400 according to this embodiment. Note that the functional arrangement of the MFP 1400 shown in FIG. 15 is substantially the same as that shown in FIG. 1, and the same reference numerals denote parts common to FIG. 1. Hence, only differences from FIG. 1 will be explained.

A service management service 1514 is a dedicated service for managing Web services, and has a function of controlling addition (install) of a new Web service, and deletion (uninstall), suspension, restart, and the like of existing Web services. In this embodiment, the service management service 1514 is included in the MFP 1400, as shown in FIG. 15. However, the service management service 1514 may be located outside the MFP 1400, and may be included in the computer terminal 1421 connected via the network 1410. Note that the service management service 1514 is configured as a Web service compatible to XML-SOAP as in other services.

In this embodiment, when the administrator installs a Web service using the service management service 1514, an XML script 106 is automatically registered together with a mount module of the Web service. That XML script 106 describes management information (in suspension, in activation, or the like) of the Web service, and the management information is checked when the user uses the Web service. When the administrator deletes the Web service using the service management service 1514, that XML script 106 is also automatically deleted.

Note that the administrator can associate other authentication/authorization services with an identical Web service by rewriting the description contents of the XML script 106. Also, authentication/authorization services can be newly associated with a new Web service that functions in combination of a plurality of Web services, thus flexibly coping with the security requirements.

The system administrator can install a Web service via the network 1410. In this case, the system administrator executes an installation process of a Web service on the computer terminal 1421 on which the service management service 1514 runs. The service management service 1514 executes the installation process of the Web service and the registration process of an XML script 106 in accordance with the service management processing flow to be described later. As a result, the XML script 106 is stored on the memory (HDD 1404) controlled by the memory device control unit 105.

<Registration, Deletion, Enabling, and Disabling Processes of XML Script>

Figure 16A:
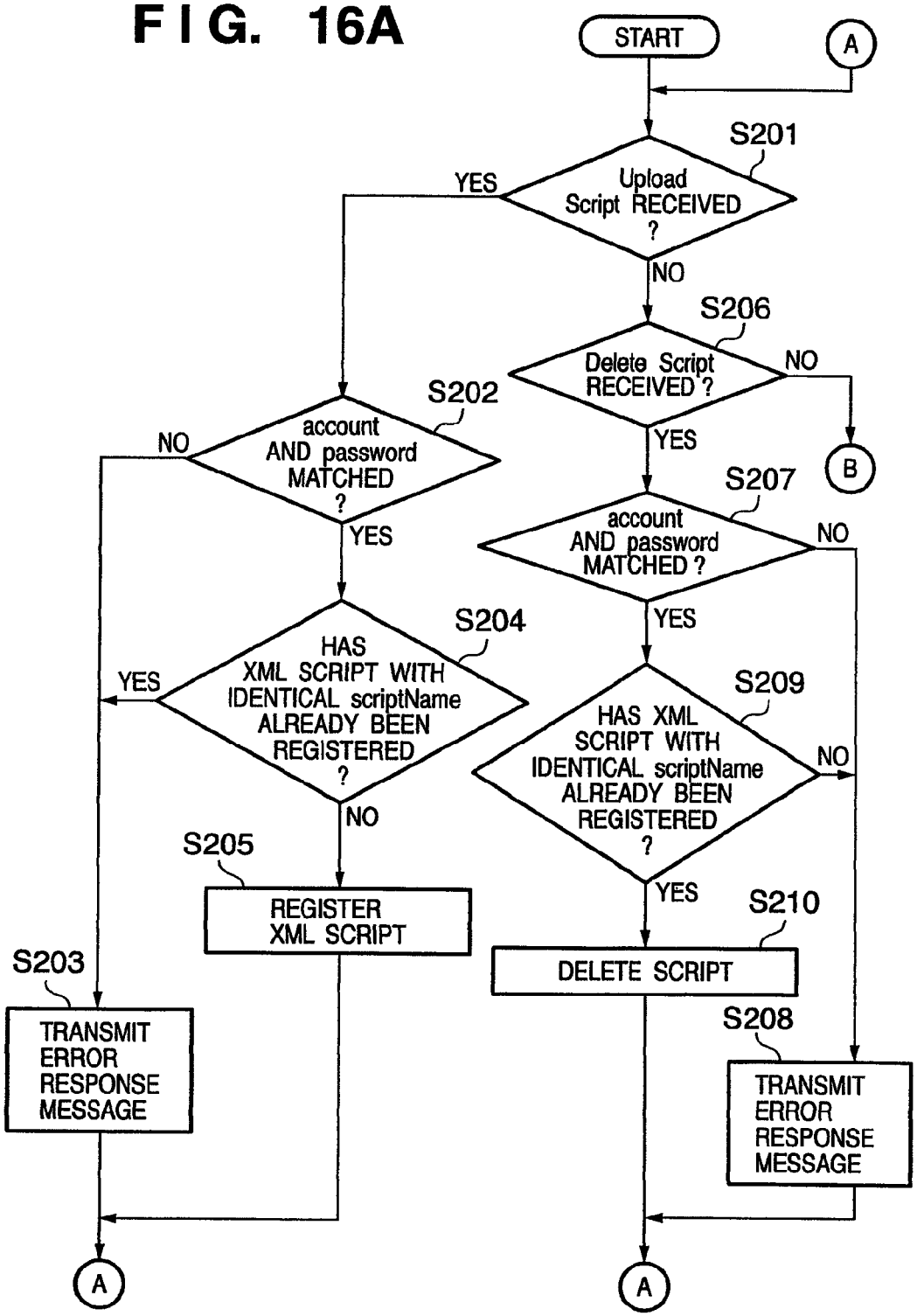
FIGS. 16A and 16B are flowcharts showing the flow of registration, deletion, and enabling processes of an XML script in the MFP according to the embodiment of the present invention.
Figure 16B:
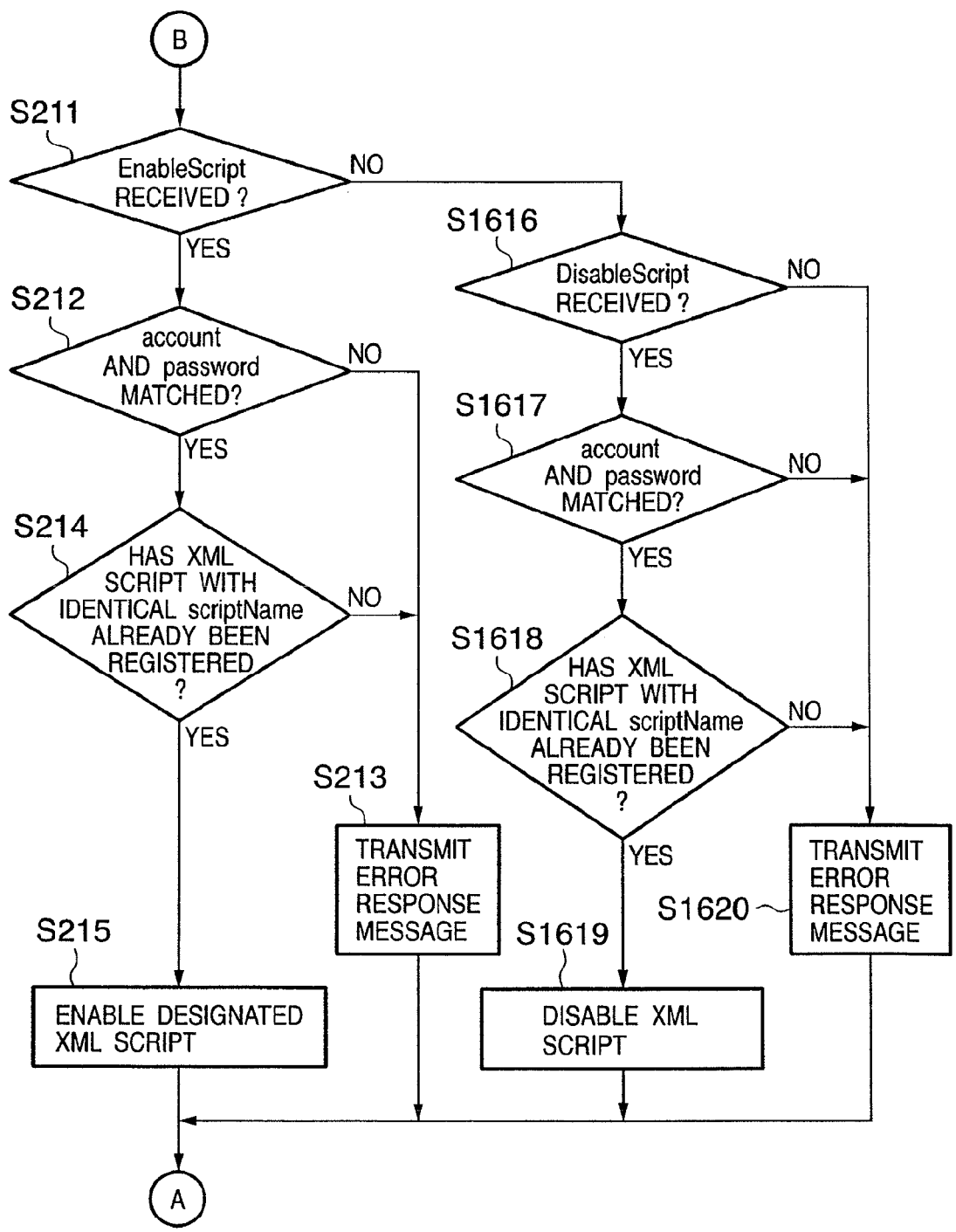

The flow of the registration, deletion, enabling, and disabling processes of an XML script 106 will be described below using FIGS. 16A and 16B. FIGS. 16A and 16B are flowcharts showing the flow of the registration, deletion, enabling, and disabling processes of an XML script 106 in the MFP 1400 according to this embodiment. Note that the same step numbers denote steps common to those in the flowchart of FIG. 2 of the steps shown in the flowchart of FIGS. 16A and 16B, and a description thereof will be omitted.

If it is determined in step S211 that no EnableScript as a SOAP request is received, the XML script processing unit 104 checks if DisableScript as a SOAP request is received via the SOAP processing unit 102 (step S1616).

If it is determined that DisableScript as the SOAP request is received, the XML script processing unit 104 checks if "account" and "password" as its arguments match account information recorded on the memory (HDD 1404) via the memory device control unit 105, so as to confirm their contents (step S1617).

If it is determined in step S1617 that the two pieces of account information do not match, the XML script processing unit 104 returns an error response message via the SOAP processing unit 102 (step S1620). On the other hand, if it is determined that the two pieces of account information match, the XML script processing unit 104 checks if an XML script with the designated "scriptName" has already been registered (step S1618).

If it is determined in step S1618 that no XML script with the designated "scriptName" is recorded on the memory (HDD 1404) (it has not already been registered), the XML script processing unit 104 returns an error response message via the SOAP processing unit 102 (step S1620).

On the other hand, if it is determined that the XML script with the designated "scriptName" is recorded on the memory (HDD 1404) (it has already been registered), the XML script processing unit 104 disables the XML script with the designated "scriptName" (step S1619), and the arbitration service 103 ceases to refer to that XML script.

The aforementioned processes are executed when the service management service 1514 issues a management command of an XML script according to an instruction pertaining to the Web service to the MFP 1400.

<Flow of Processing in Service Management Service 1514>

The service management processing flow by the system administrator will be described below using FIG. 17. In this embodiment, the service management service 1514 is incorporated as a Web service management window in a system management window in the computer terminal 1421. The system administrator carries out a series of management operations such as registration (install), deletion (uninstall), enabling, disabling, and the like of a Web service by executing the service management service 1514.

The management operation of the Web service is configured in a SOAP envelope format. In this SOAP command, the operation action type and security token pertaining to authentication authority of a command issuer are stored in a SOAP header field. When a Web service is to be added, an XML script that describes the location information of an authentication service required by the Web service in association with that Web service is appended to a SOAP body field.

Figure 17:
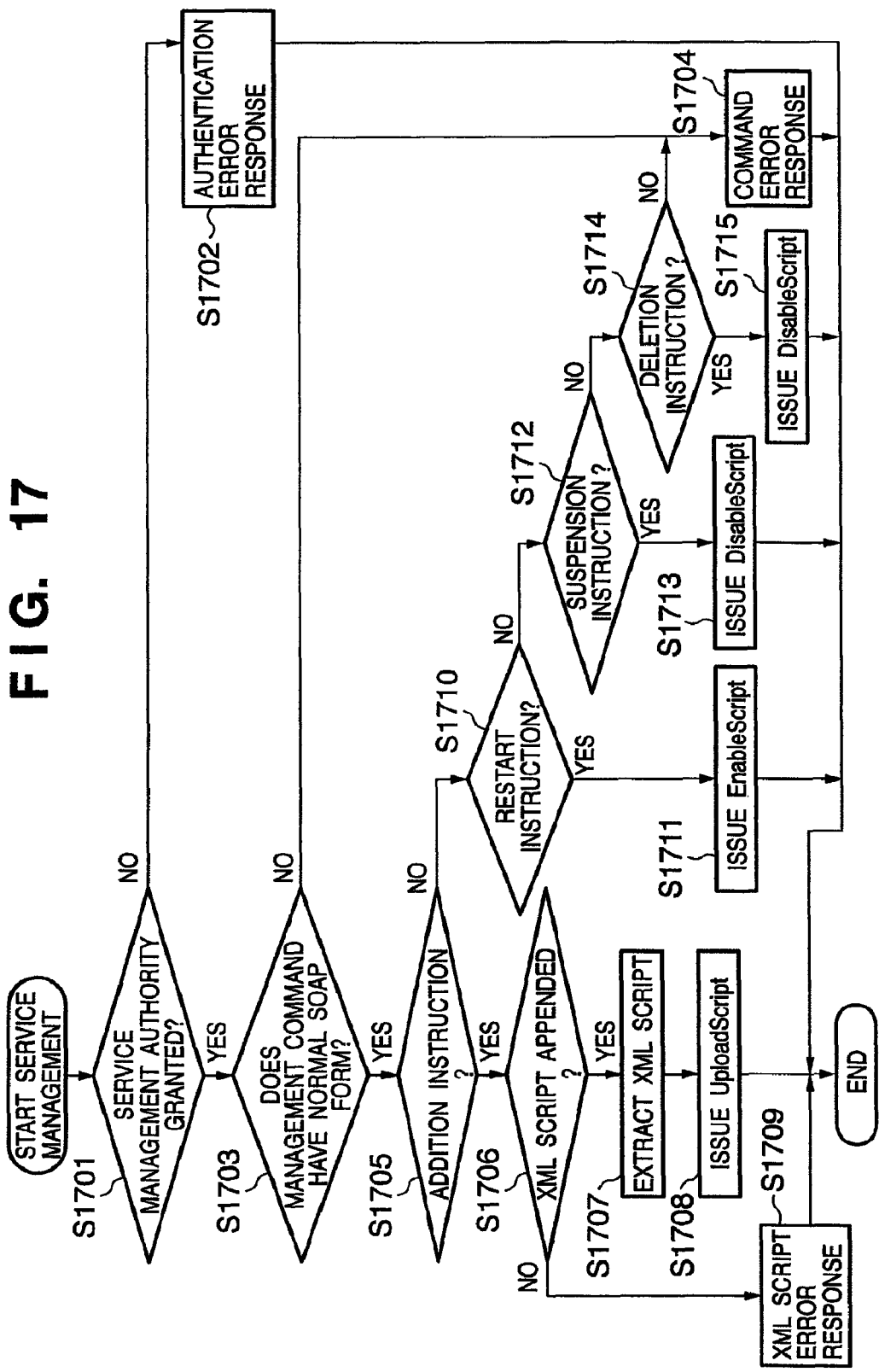
FIG. 17 is a flowchart for explaining the service management flow by a system administrator.

FIG. 17 starts when the system administrator is granted the authority as the administrator after appropriate user authentication on the aforementioned Web service management window, and designates a management operation for a Web service. It is checked in step S1701 if the operator has correct management authority as a result of user authentication executed in advance, upon executing the designated management operation of the Web service. This checking step is done using the security token in the SOAP header.

If it is determined in step S1701 that the operator does not have any appropriate management authority, an authentication error response is returned, and a window that requests user authentication is displayed again (step S1702). On the other hand, if it is determined that the operator has appropriate management authority, the management operation for the Web service is accepted.

It is checked if the management operation type and XML script are correctly included as information required for the form of a SOAP command (step S1703). If the SOAP command does not have an appropriate form (e.g., although the SOAP command is an addition command of a Web service, it does not include any XML script), a command error response is generated as a SOAP response (step S1704).

If the SOAP command is correctly formed, it is checked in step S1705 if the action type of the SOAP command is addition of a Web service. If the action type is addition of a Web service, it is checked in step S1706 if an XML script is appended to a SOAP envelope. The XML script is a MAPPING TABLE that associates the Web service to be added and location information of an authentication/authorization service required for that Web service. If this MAPPING TABLE is not available at the stage of the process for adding the Web service, that Web service cannot be used even if it is added. Hence, the presence/absence of the XML script is checked in step S1706.

If the XML script is appended, the SOAP envelope is parsed to extract the XML script stored in the SOAP body field in step S1707. Next, an UploadScript command is issued to the XML script processing unit 104 in step S1708. Note that parsing of the SOAP envelope and the form confirmation sequence are executed by the SOAP processing unit 102 in FIG. 15. On the other hand, if no XML script is appended, an error response is returned (step S1709).

If it is determined in step S1705 that the action field of the SOAP command does not include any addition instruction of a Web service, it is checked in the checking sequence in step S1710 if the action field of the SOAP command includes a restart instruction of a Web service. If the restart instruction is included, the flow advances to step S1711, and an EnableScript command is issued to the XML script processing unit 104.

If it is determined in step S1710 that the action field of the SOAP command does not include any restart instruction of a Web service, it is checked in the checking sequence in step S1712 if the action field of the SOAP command includes a suspension (disabling) instruction of a Web service. If the suspension instruction of a Web service is included, the flow advances to step S1713, and a DisableScript command is issued to the XML script processing unit 104.

If it is determined in step S1712 that the action field of the SOAP command does not include any suspension (disabling) instruction of a Web service, it is checked in the checking sequence in step S1714 if the action field of the SOAP command includes a deletion (uninstall) instruction of a Web service. If the deletion instruction of a Web service is included, the flow advances to step S1715, and a DeleteScript command is issued to the XML script processing unit 104.

If it is determined in step S1714 that the action field of the SOAP command does not include any deletion instruction of a Web service, since it is not a designed management operation and is a non-designed action, a command error response is returned (step S1704).

The commands issued in FIG. 17, i.e., the UploadScript, EnableScript, DisableScript, and DeleteScript, are issued by the SOAP processing unit 102, and are processed by the XML script processing unit 104 to register, delete, and update the XML script in accordance with the action types.

As can be seen from the above description, according to the information processing apparatus of this embodiment based on Web services, upon installing a Web service, the service management service 1514 installs a mount module of the Web service in the information processing apparatus, and simultaneously notifies the XML script processing unit 104 of an XML script (MAPPING TABLE) that describes corresponding location information of an authentication service. The XML script processing unit 104 receives this XML script, and automatically updates the XML script. Hence, the system administrator need not explicitly manually execute the installation operation of a Web service and association of the corresponding authentication service, and the management cost can be minimized.

Not only installation of a Web service but also a series of management operations such as deletion, suspension, and restart of a Web service can be easily implemented together by the service management service 1514 even in a remote environment, thus reducing the management cost.

In addition, since the update process of the MAPPING TABLE by the system administrator is automatically done upon adding/deleting a service, reflection of information indicating new addition/deletion of a service is not delayed, and an optimal security system can be introduced at an optimal timing, thus preventing damages due to illicit use.

Other Embodiments

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a Floppy® disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

The present invention is not limited to the above embodiments and various changes and modifications can be made within the spirit and scope of the present invention. Therefore to apprise the public of the scope of the present invention, the following claims are made.

CLAIM OF PRIORITY

This application claims priority from Japanese Patent Application No. 2004-258406 filed on Sep. 6, 2004, and No. 2004-355882 filed on Dec. 8, 2004, which are hereby incorporated by reference herein.

What is claimed is:

1. An information processing apparatus which provides a plurality of services, comprising:
a plurality of authentication processing units configured to execute authentication processing of a user who requests to provide a service via a network;
a memory configured to store association information indicating that authentication by one authentication processing unit of the plurality of authentication processing units is needed upon providing two or more services of the plurality of services, the one authentication processing unit indicated by the association information being changeable by a user;
a specifying unit configured to specify two or more services from the plurality of the services, based on a request from the user; and
a determination unit configured to determine one authentication processing unit from the plurality of authentication processing units in accordance with the association information stored in the memory, the determined authentication processing unit being associated with the two or more services specified by the specifying unit,
wherein when the determination unit determines the authentication processing unit upon providing the two or more services specified by the specifying unit and the user has been authenticated using the authentication processing unit determined by the determination unit, the two or more services specified by the specifying unit are provided.

2. The apparatus according to claim 1, wherein the association information is described using a structured language.

3. The apparatus according to claim 1, wherein the memory stores a plurality of pieces of association information, and executes registration of new association information and deletion of existing association information on the basis of an instruction from the user.

4. An information processing method in an information processing apparatus which provides a plurality of services and comprises a plurality of authentication processing units configured to execute authentication processing of a user who requests to provide a service via a network, comprising:
storing in a memory, association information indicating that authentication by one authentication processing unit of the plurality of authentication processing units is needed upon providing two or more services of the plurality of the services, the one authentication processing unit indicated by the association information being changeable by a user;
specifying two or more services from the plurality of the services, based on a request from the user; and
determining one authentication processing unit from the plurality of authentication processing units in accordance with the association information stored in the memory, the determined authentication processing unit being associated with the two or more services,
wherein when the authentication processing unit upon providing the specified two or more services are determined and the user has been authenticated using the determined authentication processing unit, the specified services are provided.

5. An information processing apparatus comprising:
a service request reception unit configured to receive a service request from a service request source;
a plurality of authentication processing units configured to execute authentication processing of the request source;
a memory configured to store association information indicating that the authentication by one authentication processing unit of the plurality of authentication processing units is needed upon providing two or more services of the plurality of services, the one authentication processing unit indicated by the association information being changeable by a user;
a specifying unit configured to specify two or more services from the plurality of the services, based on the service request from the service request source;
a determination unit configured to determine one authentication processing unit from the plurality of authentication processing units in accordance with the association information stored in the memory, the determined authentication processing unit being associated with the two or more services specified by the specifying unit; and
a service request unit configured to request the one authentication processing unit determined by the determination unit to authenticate the service request source, and to, when the service request source has been authenticated by the one authentication processing unit determined by the determination unit, request two or more service providing units to provide the specified two or more services.

6. An information processing method in an information processing apparatus which provides a plurality of services and comprises a plurality of authentication processing units configured to execute authentication processing, comprising:
receiving a service request from a service request source;
storing in a memory, association information indicating that authentication by one authentication processing unit of the plurality of authentication processing units is needed upon providing two or more services of the plurality of the services, the one authentication processing unit indicated by the association information being changeable by a user;
specifying two or more services from the plurality of the services, based on the service request from the service request source;
determining one authentication processing unit from the plurality of authentication processing units in accordance with the association information stored in the memory, the determined authentication processing unit being associated with the two or more specified services; and
requesting the determined authentication processing unit to authenticate the service request source, and requesting, when the service request source has been authenticated by the determined authentication processing unit, two or more service providing units to provide the specified two or more services.

7. An information processing apparatus for providing a service requested by a user from a plurality of services, comprising:
a plurality of authentication processing units configured to execute authentication processing of a user who requests to provide a service via a network;
a recording unit configured to record, in a memory, association information indicates that authentication by one authentication processing unit of the plurality of authentication processing units is needed upon providing two or more services of the plurality of the services, the one authentication processing unit indicated by the association information being changeable by a user;
a specifying unit configured to specify two or more services from the plurality of the services, based on a request from the user;

a determination unit configured to determine one authentication processing unit from the plurality of authentication processing units in accordance with the association information recorded in the memory, the determined authentication processing unit being associated with the two or more services specified by the specifying unit;

a providing unit configured to provide the two or more services specified by the specifying unit when the user has been authenticated using the one authentication processing unit determined by the determination unit;

a receiving unit configured to receive a request of addition of a new service; and a discrimination unit configured to discriminate whether information pertaining to the new service is appended with the request, wherein the information describes association between information pertaining to the new service, and information pertaining to the authentication processing unit which executes authentication processing upon providing the new service, wherein, when the discrimination unit discriminates that the information is appended with the request, the recording unit adds the information pertaining to the new service to the association information recorded in the memory.

8. The apparatus according to claim 7, wherein the receiving unit receives a request of deletion of a service and when the service is deleted on the basis of the request received by the receiving unit, the recording unit deletes information pertaining to the deleted service from the association information.

9. The apparatus according to claim 7, wherein the receiving unit receives a request of restarting of a service and when the service is restarted to be provided on the basis of the request received by the receiving unit, the recording unit rewrites the association information in association with information pertaining to the restarted service.

10. The apparatus according to claim 7, wherein the receiving unit receives a request of suspending of a service and when the service is suspended on the basis of the request received by the receiving unit, the recording unit rewrites the association information in association with information pertaining to the suspended service.

* * * * *